United States Patent
Tetsuno et al.

(10) Patent No.: US 7,079,941 B2
(45) Date of Patent: Jul. 18, 2006

(54) ENGINE STARTING SYSTEM

(75) Inventors: Masayuki Tetsuno, Hiroshima (JP);
Junichi Taga, Hiroshima (JP);
Kiyotaka Mamiya, Hiroshima (JP);
Hideki Hosoya, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 2 days.

(21) Appl. No.: 11/090,309

(22) Filed: Mar. 28, 2005

(65) Prior Publication Data

US 2005/0221952 A1 Oct. 6, 2005

(30) Foreign Application Priority Data

Mar. 29, 2004 (JP) .............................. 2004-095593
Mar. 29, 2004 (JP) .............................. 2004-095996

(51) Int. Cl.
*B06K 41/04* (2006.01)
*F02N 9/02* (2006.01)

(52) U.S. Cl. .................... 701/112; 123/179.5; 477/115

(58) Field of Classification Search ............... 701/112, 701/113, 115, 102; 123/179.5, 198 F, 179.15; 477/115; 180/65.2, 65.4
See application file for complete search history.

(56) References Cited

U.S. PATENT DOCUMENTS 6,651,619 B1 * 11/2003 Ogiso .................... 123/339.11
6,856,032 B1 * 2/2005 Blackburn et al. ......... 290/40 A
6,936,934 B1 * 8/2005 Morimoto et al. ......... 180/65.2

FOREIGN PATENT DOCUMENTS

| EP | 1 403 512 A1 | 3/2004 |
|---|---|---|
| JP | 60-84743 | 6/1985 |
| JP | 60-128975 | 8/1985 |
| JP | 2001-173473 | 6/2001 |
| JP | 2005-282426 | 10/2005 |

OTHER PUBLICATIONS

Copy of official action, attached with an English translation, dated Nov. 17, 2005.

* cited by examiner

*Primary Examiner*—Hieu T. Vo

(57) ABSTRACT

An engine starting system includes a throttle valve, an alternator, an engine speed sensor and an electronic control unit (ECU). The ECU functionally includes an automatic engine stop controller for automatically stopping the engine by interrupting fuel injection when predefined automatic engine stop conditions are satisfied, and an automatic engine restart controller for automatically restarting the engine when predefined engine restart conditions are satisfied. The automatic engine stop controller sets the quantity of intake air at a level higher than a minimum quantity of intake air necessary for keeping the engine running, decreases the amount of electric power generated by the alternator in an early part of automatic engine stop control operation, and decreases the quantity of intake air and causes the alternator to once decrease the amount of electric power generated thereby at a point in time when the engine speed drops down to a predetermined reference engine speed, and causes the alternator to later increase the amount of electric power generated thereby.

12 Claims, 16 Drawing Sheets

COMPRESSION STROKE CYLINDER      EXPANSION STROKE CYLINDER

PISTON STOP POSITION [° ATDC CA]

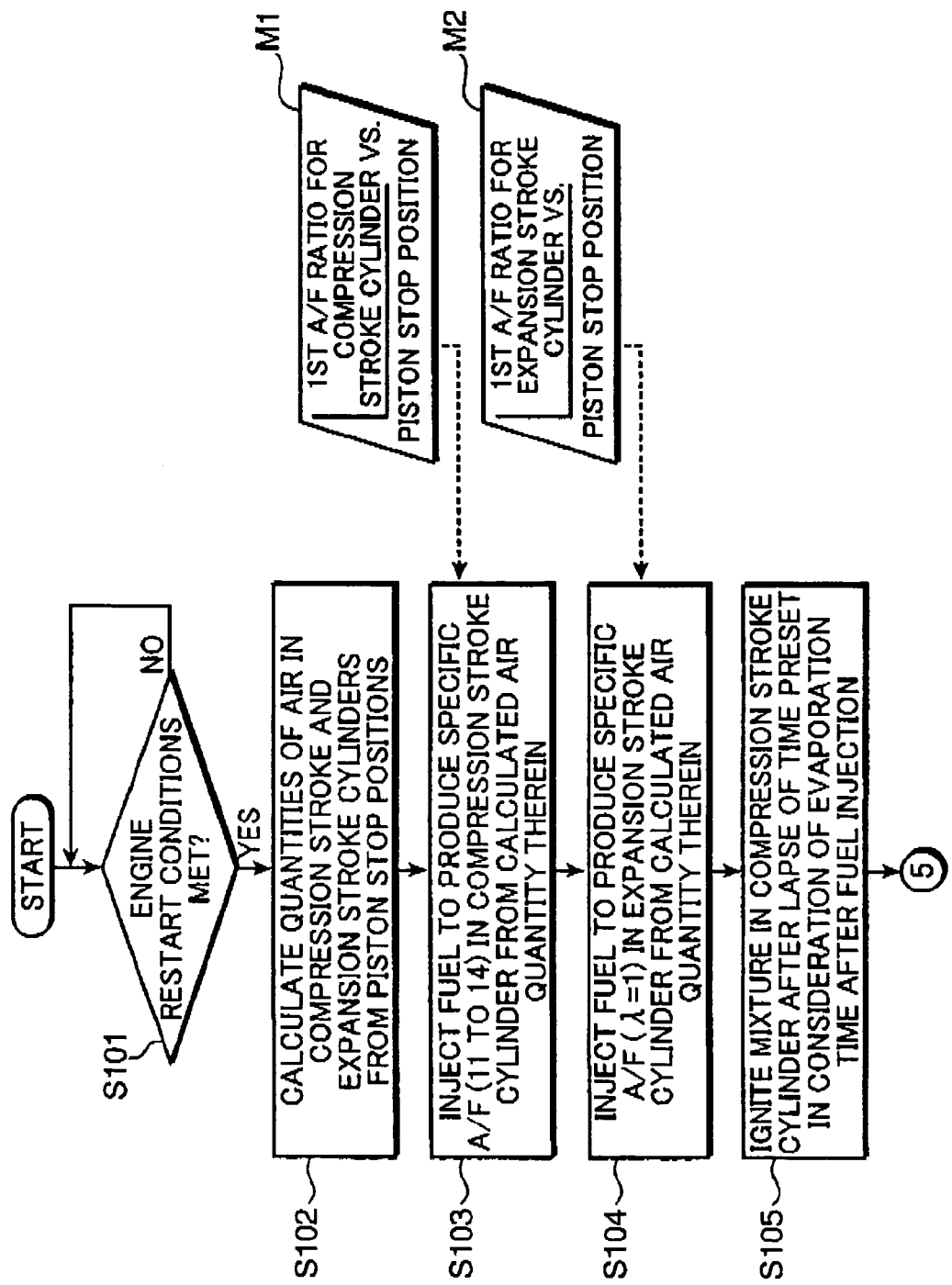

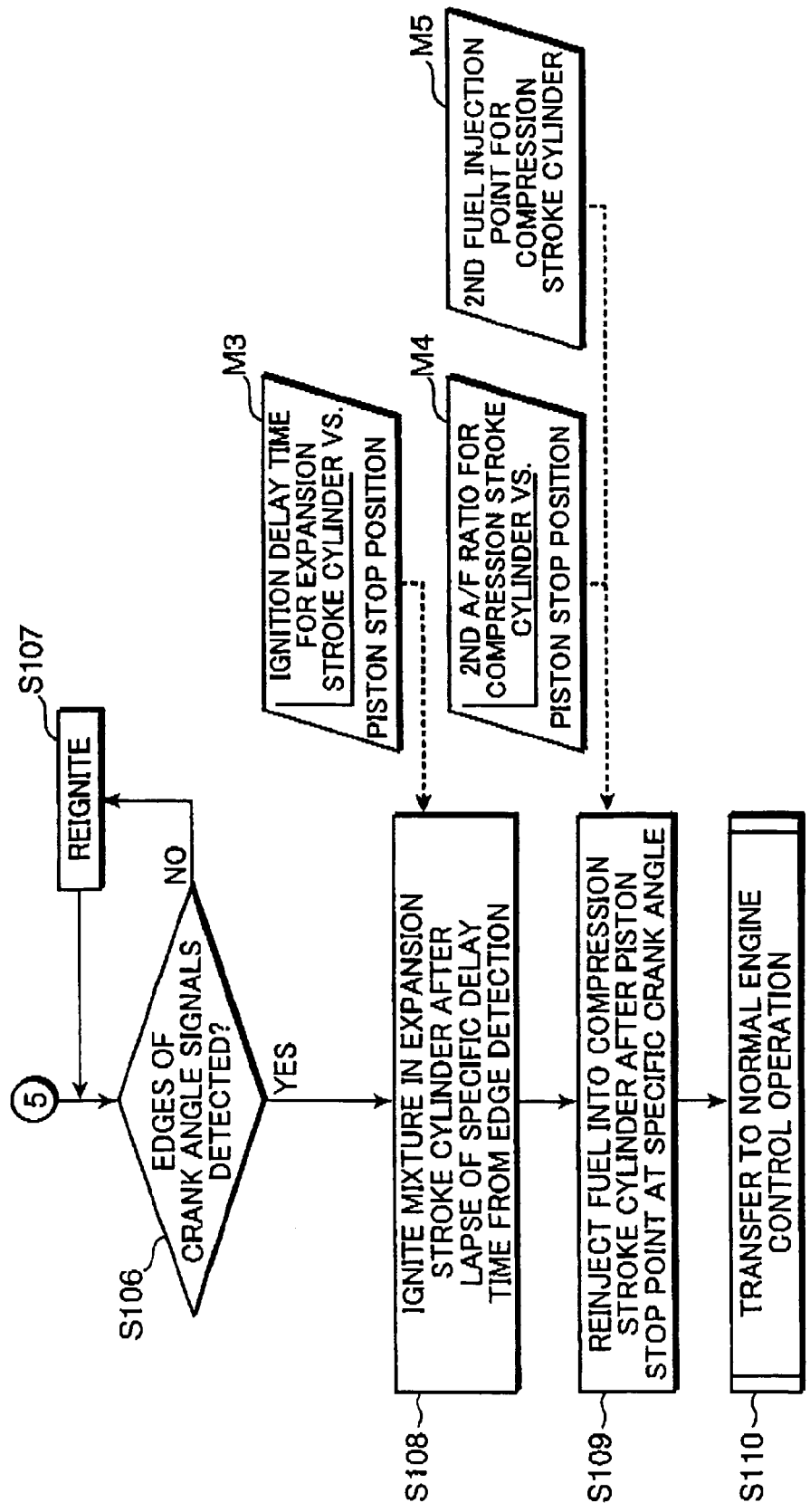

ENGINE STARTING SYSTEM

BACKGROUND OF THE INVENTION

1. Field of the Invention

The present invention relates to an engine starting system for automatically stopping an engine when predefined conditions for automatic engine stop are satisfied in an engine idling state, for instance, and restarting the engine when conditions for engine restart are satisfied after automatic engine stop.

2. Description of the Related Art

Automatic engine stop control technology, or so-called idle stop control technology, has been developed in recent years, aiming at reducing fuel consumption of and carbon dioxide ($CO_2$) emissions, for instance, from an engine. This technology automatically stops the engine at idle, for instance, and automatically restarts the engine at a point in time when engine restart conditions are satisfied as a result of a driver's action taken after idle stop for starting up a vehicle, for instance. Generally, engine restart performed during idle stop control operation requires promptness to instantly restart the vehicle in response to a vehicle start-up action, for instance. If a widely practiced conventional method of engine restart in which the engine is restarted by cranking an output shaft of the engine by means of a starter motor is used, however, there arises a problem that a good deal of time is needed up to completion of an engine start sequence.

Thus, it is desirable to supply fuel into a cylinder which has stopped on an expansion stroke at Idle stop and cause ignition and combustion to occur in that cylinder so that the engine is instantly started with resultant combustion energy. However, if the position where a piston in the cylinder which has stopped on the expansion stroke is inappropriate, that is, if the piston has stopped at top dead center or at a position extremely close to bottom dead center, for instance, the quantity of air in the cylinder is significantly small so that it is impossible to obtain a sufficient amount of combustion energy, or the distance traveled by the piston while the combustion energy is exerted on the piston Is so small that it may be impossible to normally restart the engine.

There exist conventional approaches aimed at solving the aforementioned problems. For example, Japanese Laid-open Utility Model Publication No. 1985-128975 proposes an engine starting system in which a crankshaft of an engine is provided with a braking device which is controlled in such a way that the piston in a cylinder which stops on the expansion stroke would halt at an appropriate position halfway on the expansion stroke.

Also, Japanese Laid-open Patent Application No. 2001-173473 discloses an engine starting system which, when it is judged that automatic engine stop conditions have been satisfied, increases intake air pressure to boost compressive pressure produced in a cylinder of which piston halts on the expansion stroke so that the piston in the cylinder stops at a specified position.

Further, Laid-open European Patent Application No. 1403512 shows an engine starting system which, when it is judged that automatic engine stop conditions have been satisfied, increases the quantity of intake air for a specified period of time to regulate the quantity of intake air so that the piston in the cylinder stops at a specified position while accelerating exhaust gas scavenging operation.

According to the engine starting system proposed in Japanese Laid-open Utility Model Publication No. 1985-128975, it is necessary to provide a device for braking the crankshaft of the engine in addition to an ordinary vehicle braking device. Additionally, it is necessary to control the crankshaft braking device with high precision in order that the piston in the cylinder which stops on the expansion stroke would settle at the appropriate position. A problem of this engine starting system is that it is so difficult to control the crankshaft braking device with the desired precision.

On the other hand, the engine starting system of Japanese Laid-open Patent Application No. 2001-173473, which is configured such that the in-cylinder compressive pressure is increased by boosting the intake air pressure at a point in time when the automatic engine stop conditions have been satisfied, has a problem that it is difficult to properly stop the piston at a position suited for engine restart if the degree of engine speed slowdown varies causing a change in the position where the piston stops. This engine starting system also has a problem that it is difficult to sufficiently improve exhaust gas scavenging performance of the engine at automatic engine stop.

By comparison, the engine starting system of Laid-open European Patent Application No. 1403512 causes the piston to stop at a position where a sufficient quantity of air has been introduced into the cylinder which stopped on the expansion stroke, so that piston movement up to a point of complete stop becomes more stable. Therefore, even if the degree of engine speed slowdown varies to a certain extent, this engine starting system can cause the piston at the specified position more easily. Moreover, since the exhaust gas scavenging operation is accelerated by temporarily increasing the intake air quantity, it is possible to ensure a sufficient quantity of fresh intake air even when restarting the engine immediately after engine stop.

However, the engine starting system of Laid-open European Patent Application No. 1403512 still has a problem that it is difficult to avoid changes in the piston stop position due to the influence of differences in intake system and other engine characteristics from one engine to another as well as variations in engine temperature and other parameters. Under such circumstances, it is desired to develop technology which makes it possible to suppress variations in the piston stop position and cause the piston to stop at an appropriate position in a more reliable fashion than ever.

SUMMARY OF THE INVENTION

In light of the aforementioned problems of the prior art, it is an object of the invention to provide an engine starting system which can efficiently improve scavenging performance of an engine at automatic engine stop and cause each piston to stop at an appropriate position in a more reliable fashion than ever, thereby offering an enhanced engine restart capability.

An engine starting system according to a principal (first) aspect of the invention is for automatically stopping an engine which includes a fuel injection controller for controlling the quantity of fuel to be injected by each of fuel injectors directly into a plurality of cylinders and fuel injection timing thereof, an ignition controller for controlling ignition timing of spark plugs of the individual cylinders, an intake air quantity regulator for regulating the quantity of intake air introduced into each of the cylinders, an alternator driven by the engine, and a rotating speed sensing device for detecting engine speed. The engine starting system includes an automatic engine stop controller for automatically stopping the engine by interrupting fuel injection from the fuel injectors as necessary for keeping the engine running when predefined automatic engine stop conditions are satisfied, and an automatic engine restart controller for automatically restarting the engine by causing the fuel injector of at least one of the cylinders which is on expansion stroke at engine stop and causing the spark plug of that cylinder to ignite a mixture produced therein when predefined engine restart conditions are satisfied. The aforesaid automatic engine stop controller sets the quantity of intake air regulated by the aforesaid intake air quantity regulator at a level higher than a minimum quantity of intake air necessary for keeping the engine running by a specific amount and sets a scavenging mode period for expelling in-cylinder exhaust gas by decreasing the amount of electric power generated by the aforesaid alternator prior to fulfillment of the automatic engine stop conditions in an early part of automatic engine stop control operation, the aforesaid automatic engine stop controller causes the aforesaid intake air quantity regulator to decrease the quantity of intake air and causes the aforesaid alternator to once decrease the amount of electric power generated thereby at a point in time when the engine speed drops down to a predetermined reference engine speed, and the aforesaid automatic engine stop controller causes the aforesaid alternator to increases the amount of electric power generated thereby after a lapse of a specific period of time.

These and other objects, features and advantages of the invention will become more apparent upon reading the following detailed description along with the accompanying drawings.

BRIEF DESCRIPTION OF THE DRAWINGS

FIG. 14 is a flowchart showing engine restart control operation for restarting the engine;

DETAILED DESCRIPTION OF THE PREFERRED EMBODIMENTS OF THE INVENTION

Figure 1:
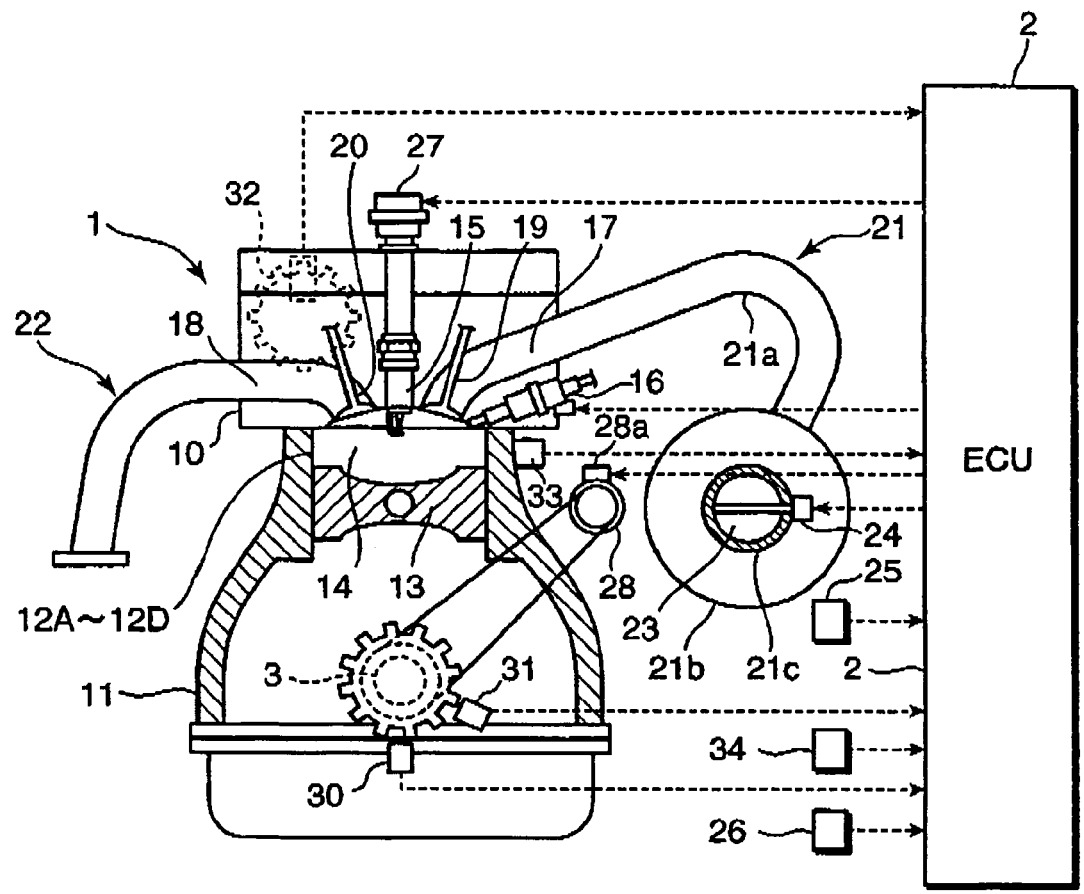
FIG. 1 is a diagram generally showing the structure of a four-cycle engine provided with an engine starting system according to a preferred embodiment of the present invention.
Figure 2:
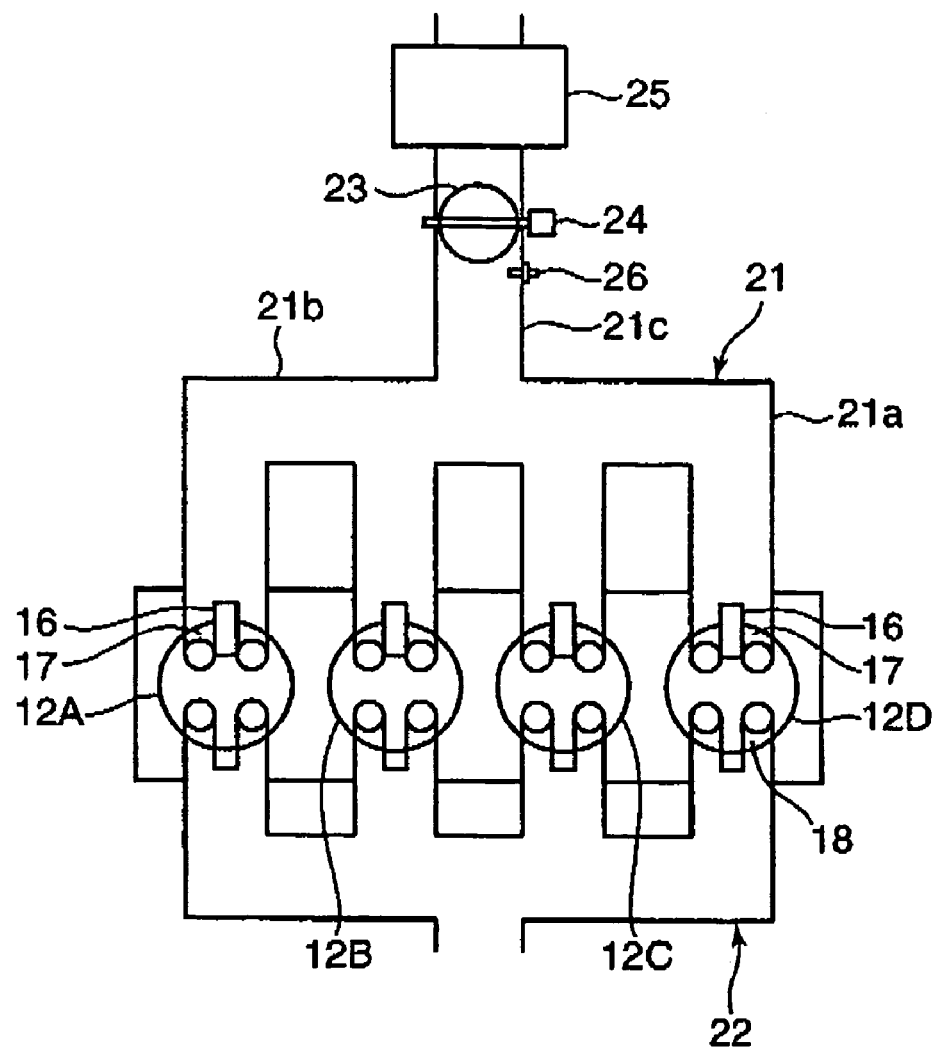
FIG. 2 is an explanatory diagram showing the structure of an intake system and an exhaust system of the engine of FIG. 1.

FIGS. 1 and 2 are diagrams generally showing the structure of a four-cycle spark ignition engine provided with an engine starting system according to a preferred embodiment of the present invention. This engine includes an engine body 1 having a cylinder head 10 and a cylinder block 11 and an electronic control unit (ECU) 2 for performing engine control. The engine body 1 has four cylinders 12A–12D, which may hereinafter be referred to as the first cylinder 12A, the second cylinder 12B, the third cylinder 12C and the fourth cylinder 12D, or simply as the cylinders 12 collectively. Pistons 13 connected to a crankshaft 3 are fitted in the individual cylinders 12A–12D whereby a combustion chamber 14 is formed above the piston 13 in each of the cylinders 12A–12D as shown In FIG. 1.

Disposed at the top of the combustion chamber 14 formed in each of the cylinders 12A–12D is a spark plug 15 with an electrode of the spark plug 15 at a far end thereof located in the combustion chamber 14. The individual spark plugs 15 are connected to an ignition device 27 for actuating the spark plugs 15 to create an electric spark. Each of the cylinders 12A–12D is provided with a fuel injector 16 installed on one side (right side as Illustrated in FIG. 1) of the combustion chamber 14 for injecting fuel directly into the combustion chamber 14. Incorporating a needle valve and a solenoid which are not illustrated, the fuel injector 16 is so disposed as to spray the fuel toward the vicinity of the electrode of the spark plug 15. Each of the fuel injectors 16 is actuated by a pulse signal fed from the ECU 2. When this pulse signal is input, the fuel injector 16 opens for a period of time corresponding to the pulse length of the pulse signal to inject the fuel in a quantity corresponding to valve opening time into the cylinder 12.

There are formed intake ports 17 and exhaust ports 18 opening into the combustion chambers 14 of the individual cylinders 12A–12D at upper portions thereof with intake valves 19 and exhaust valves 20 provided in the intake ports 17 and the exhaust ports 18, respectively. The intake valves 19 and the exhaust valves 20 are actuated by valve actuating mechanisms (not shown) including camshafts. Opening and closing timing of the intake and exhaust valves 19, 20 of the individual cylinders 12A–12D is preset such that the cylinders 12A–12D undergo successive combustion cycles of intake, compression, expansion and exhaust strokes with a specific phase delay from one cylinder to another.

The intake ports 17 are connected to an intake passage 21 while the exhaust ports 18 are connected to an exhaust passage 22. A downstream part of the intake passage 21 close to the intake ports 17 is divided into four independent branched intake channels 21a which are connected to the individual cylinders 12A–12D as shown in FIG. 2. Upstream ends of these branched intake channels 21a are individually connected to a surge tank 21b. A portion of the intake passage 21 further upstream of the surge tank 21b constitutes a common intake passage portion 21c which supplies air to all of the cylinders 12A–12D. Provided in the common intake passage portion 21c is a throttle valve (intake air quantity regulator) 23 associated with an actuator 24 for driving the throttle valve 23. Provided further in the common intake passage portion 21c are an airflow sensor 25 for detecting the quantity of intake air and outputting a resultant sensing signal to the ECU 2 and an intake air pressure sensor 26 for detecting intake air pressure (negative pressure) and outputting a resultant sensing signal to the ECU 2.

The engine body 1 is further provided with an alternator (AC generator) 28 which is connected to the crankshaft 3 by a timing belt, for example. Although not illustrated in detail, the alternator 28 has a built-in regulator circuit 28a which regulates the amount of electric power generated by the alternator 28 by controlling a current flowing through a field coil to vary output voltage according to a control signal fed from the ECU 2 to the regulator circuit 28a. Essentially, the amount of electric power generated is controlled according to the amount of load of on-board electric devices and battery.

The engine further includes a pair of first and second crank angle sensors 30, 31 for detecting the angle of rotation of the crankshaft 3. These crank angle sensors 30, 31 together constitutes a rotating speed sensing device (engine speed sensor) for determining the rotating speed of the crankshaft 3. The ECU 2 determines engine speed based on a sensing signal output from the first crank angle sensor 30. Also, as will be later discussed in detail, the ECU 2 determines the direction and angle of rotation of the crankshaft 3 from mutually phase-offset sensing signals (first crank angle signal CA1 and second crank angle signal CA2) output from the two crank angle sensors 30, 31 as will be later discussed in detail.

The engine further includes cam angle sensors 32 provided on the aforementioned camshafts for detecting specific rotational positions of the camshafts for identifying the individual cylinders 12A–12D, a water temperature sensor 33 for detecting the temperature of engine cooling water and an accelerator stroke sensor 34 for detecting throttle opening corresponding to the amount of depression of an accelerator pedal by a driver, Sensing signals output from these sensors 32, 33, 34 are input into the ECU 2.

Upon receiving the sensing signals fed from the individual sensors 25, 26, 30–34 mentioned above, the ECU 2 outputs a control signal (pulse signal) for controlling the quantity of fuel to be injected and fuel injection timing to each fuel injector 16, a control signal for controlling ignition timing to the ignition device 27 connected to the spark plugs 15 for actuating the individual spark plugs 15, and a control signal for controlling the opening of the throttle valve 23 to the actuator 24. While a detailed description will be given later, the ECU 2 automatically stops the engine by cutting fuel injection into the individual cylinders 12A–12D when predefined conditions for automatic engine stop are satisfied during engine idle operation, and automatically restarts the engine when predefined conditions for engine restart, such as depression of the accelerator pedal by the driver, are satisfied subsequently.

In other words, the ECU 2 functionally incorporates a fuel injection controller for controlling the quantity of fuel to be injected by each fuel injector 16 and fuel injection timing thereof and an ignition controller for controlling ignition timing of each spark plug 15. The ECU 2 further incorporates functionally an automatic engine stop controller and an automatic engine restart controller. The automatic engine stop controller automatically stops the engine by interrupting fuel injection from the fuel injectors 16 necessary for keeping the engine running when the predefined automatic engine stop conditions are satisfied. The automatic engine restart controller automatically restarts the engine by causing the fuel injector 16 of at least one of the cylinders 12A–12D which is on the expansion stroke at engine stop and causing the spark plug 15 of that cylinder 12 to ignite a mixture produced therein when the predefined engine restart conditions are satisfied.

Specifically, the automatic engine restart controller restarts the engine as follows. First, when restarting the engine automatically stopped at idle, the automatic engine restart controller produces initial combustion in one of the cylinders 12A–12D which was on the compression stroke at idle stop to force down the piston 13 in that cylinder 12 (which is hereinafter referred to as the compression stroke cylinder 12), thereby causing the crankshaft 3 to turn a little in a reverse running direction thereof. As a result, the piston 13 in the cylinder 12 which was on the expansion stroke at idle stop (which is hereinafter referred to as the expansion stroke cylinder 12) is caused to once ascend so that a mixture in the same cylinder 12 is compressed. In this condition, the mixture in the cylinder 12 which was initially on the expansion stroke is ignited to cause combustion in the cylinder 12 to produce a torque acting on the crankshaft 3 in a forward running direction thereof to restart the engine.

To properly restart the engine by just igniting the fuel injected Into a particular cylinder as mentioned above without the aid of a starter motor, it Is necessary to produce sufficient combustion energy by combusting the mixture in the cylinder 12 which was on the expansion stroke at idle stop to ensure that the piston 13 in the cylinder 12 which will reach the compression stroke top dead center (TDC) (or the cylinder 12 which was on the compression stroke at idle stop) can subsequently go beyond TDC overwhelming a compressive reaction force acting on the piston 13. It is therefore essential for the cylinder 12 which was on the expansion stroke at idle stop to hold a sufficient quantity of air necessary for combustion to ensure reliable engine restart.

Figure 3A:
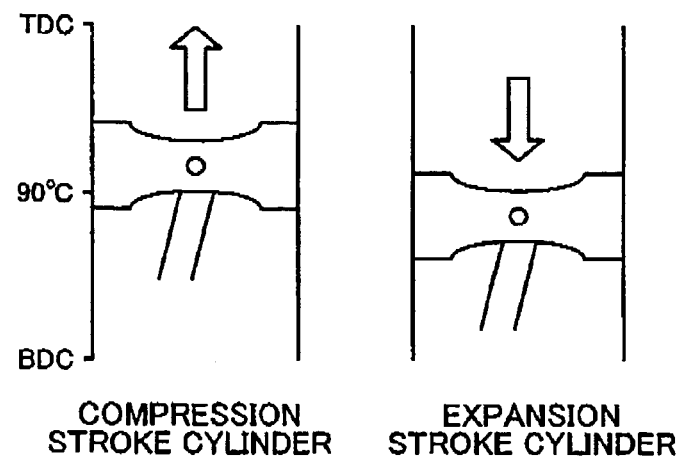
FIGS. 3A and 3B are explanatory diagrams showing a relationship between piston positions and the quantities of air in cylinders which are on an expansion stroke and on a compression stroke at engine stop.
Figure 3B:
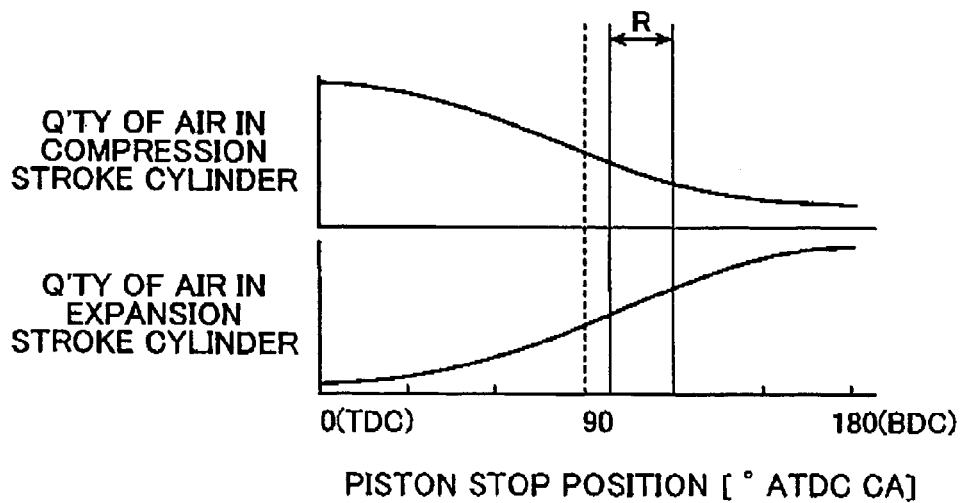

As shown In FIGS. 3A and 3B, the compression stroke cylinder 12 which is on the compression stroke at idle stop and the expansion stroke cylinder 12 which is on the expansion stroke at idle stop are offset in phase from each other by as much as 180° in terms of crank angle so that the pistons 13 in these cylinders 12 move in opposite directions. If the piston 13 in the initially expansion stroke cylinder 12 is located at a point closer to bottom dead center (BDC) than a midpoint of the expansion stroke, sufficient combustion energy is obtained since the expansion stroke cylinder 12 contains a sufficient quantity of air. If the piston 13 in the initially expansion stroke cylinder 12 is located at a point extremely closer to BDC at idle stop, however, the quantity of air in the compression stroke cylinder 12 at idle stop would be too small, making it difficult to obtain an adequate quantity of air needed for reversing the crankshaft 3 by initial combustion at engine restart.

By comparison, if it is possible to cause the piston 13 in the expansion stroke cylinder 12 to stop at about the midpoint of the expansion stroke, or within a specified (target) range R situated more or less closer to BDC than a point of a crank angle of 90° after the compression stroke TDC, such as a range of 100° to 120° after the compression stroke TDC (ATDC) in terms of crank angle, a specific quantity of air would be maintained within the cylinder 12 initially on the compression stroke. This would make it possible to obtain such a level of combustion energy that is high enough to cause the crankshaft 3 to turn a little in the reverse running direction by the initial combustion. Moreover, by maintaining a sufficient quantity of air in the cylinder 12 initially on the compression stroke, it becomes possible to generate a sufficient amount of combustion energy for causing the crankshaft 3 to turn in the forward running direction.

Accordingly, the aforementioned automatic engine stop controller incorporated in the ECU 2 performs control operation as discussed in the following with reference to FIG. 4, which is a time chart showing how engine speed Ne, boost pressure Bt, throttle opening K and the amount of generated electric power Ge vary during a sequence of automatic engine stop.

Figure 4:
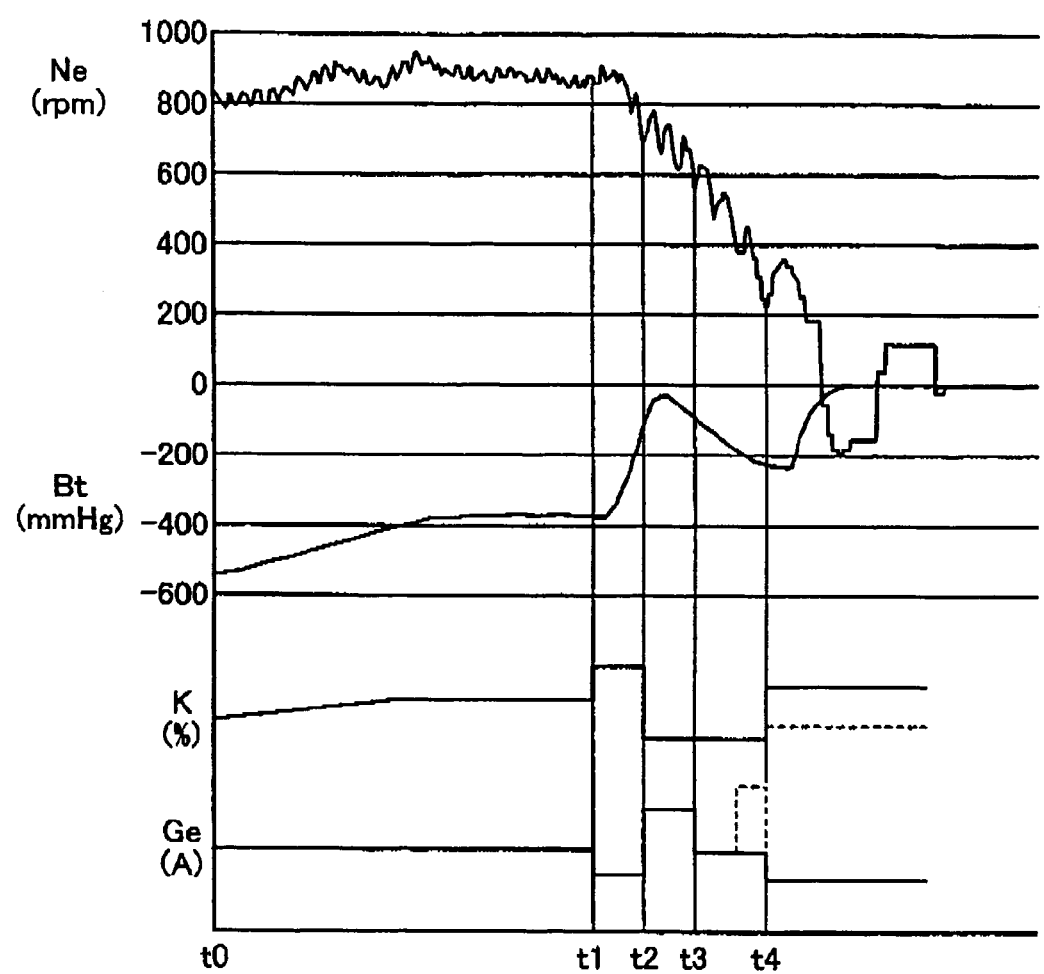
FIG. 4 is a time chart showing how engine speed, boost pressure, throttle opening and the amount of generated electric power vary during a sequence of automatic engine stop.

At a point in time t0 shown in FIG. 4 when the aforementioned automatic engine stop conditions are satisfied, the automatic engine stop controller of the ECU 2 sets a target engine speed (which is an idle engine speed, at which the automatic engine stop conditions are satisfied) to a value higher than an ordinary idle engine speed at which the engine is not caused to automatically stop, that is, a target engine speed of approximately 850 revolutions per minute (rpm) (at which an automatic transmission is set at a "neutral" position) if the engine is of a type of which ordinary idle engine speed is set at 650 rpm (at which an automatic transmission is set at a "drive" position), for example. By performing such a control operation, the automatic engine stop controller of the ECU 2 stabilizes the engine speed Ne at a point slightly higher than the ordinary Idle engine speed.

At a point in time t1 when the engine speed Ne becomes stabilized at the aforementioned target engine speed, the automatic engine stop controller of the ECU 2 cuts off fuel injection and causes the engine speed Ne to drop. It is to be pointed out that even though the fuel injection Is interrupted, the ECU 2 causes the spark plugs 15 to continue igniting the mixture at least until the end of a period during which the fuel previously injected into the individual cylinders 12A–12D is combusted so that all of the already injected fuel would be burnt.

Also, at the point in time t1 when the fuel injection is interrupted in an initial stage of the control operation for automatically stopping the engine, the ECU 2 sets the opening K of the throttle valve 23 in such a fashion that the actual quantity of intake air becomes larger than the quantity of intake air in an ordinary idle state in which in-cylinder air-fuel ratio λ=1 (or larger than a minimum quantity of intake air necessary for keeping the engine running at idle). More specifically, since the engine is run by homogeneous charge combustion with the in-cylinder air-fuel ratio (air-fuel ratio) set at 1 or approximately 1 (i.e., λ~1) immediately before the point in time t1, the ECU 2 increases the opening K of the throttle valve 23 (e.g., K~30%) to set the quantity of intake air fed into the cylinders 12A–12D at a level higher than the minimum quantity of intake air necessary for keeping the engine running by a specific amount in order to ensure exhaust gas scavenging performance. At the same time (point in time t1), the ECU 2 decrease the amount of electric power Ge generated by the alternator 28 compared to the amount of electric power Ge generated at the point in time t0 when the automatic engine stop conditions are satisfied in order to reduce rotational resistance of the crankshaft 3.

The engine starting system of the present embodiment is configured to perform the following control operation. Specifically, when the fuel injection is interrupted at the point in time t1 in the aforementioned fashion, the engine speed Ne begins to decrease. Subsequently, at a point in time t2 when it is verified that the engine speed Ne has become equal to or lower than a predetermined reference engine speed N2, such as 760 rpm, the ECU 2 closes the throttle valve 23 to decrease the quantity of air introduced into the cylinders 12A–12D of the engine and increases the amount of electric power Ge generated by the alternator 28. Also, as will be described later, the ECU 2 regulates the amount of electric power Ge generated by the alternator 28 in accordance with the decrease rate of the engine speed Ne after a particular time period elapses from the point in time t1, so that the engine speed Ne would decrease along an experimentally predetermined reference line, for instance.

When the engine is automatically stopped as described above, kinetic energy possessed by various moving parts, such as the crankshaft 3 and a flywheel, is consumed by losses due to mechanical friction and pumping work produced by the individual cylinders 12A–12D, for instance, so that the engine speed Ne gradually decreases after fuel supply interruption. The engine eventually stops after turning several times, e.g., approximately 10 times in the case of a four-cycle four-cylinder engine, by inertia. Specifically, the engine speed Ne gradually approaches zero while going up and down repetitively each time the cylinders 12A–12D go beyond successive compression stroke TDCs as depicted in FIG. 4.

Figure 5:
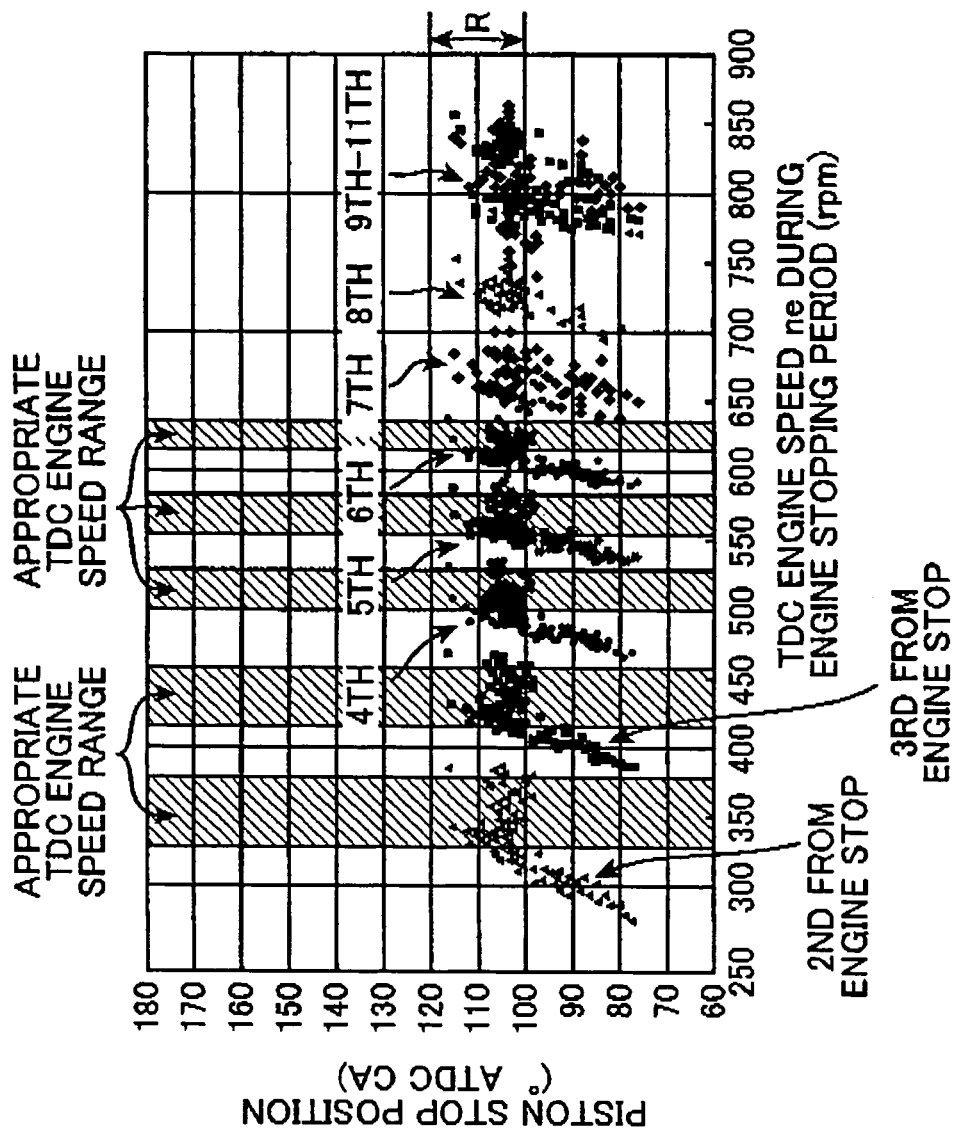
FIG. 5 is a distribution chart showing how the engine speed during an engine stopping period is correlated with piston stop positions at engine stop.

In the automatic engine stop sequence illustrated in FIG. 5, air pressure in the compression stroke cylinder 12 which approaches the compression stroke TDC after the engine has gone beyond the compression stroke TDC for the last time at a point in time t4 increases as the piston 13 in the compression stroke cylinder 12 ascends due to inertial force. As the piston 13 in the compression stroke cylinder 12 ascends in this fashion, there develops a compressive reaction force in the compression stroke cylinder 12, whereby the piston 13 is forced back and can not go beyond TDC, causing the crankshaft 3 to turn in the reverse running direction. Since this reverse turning of the crankshaft 3 causes air pressure in the expansion stroke cylinder 12 to rise, the piston 13 in the expansion stroke cylinder 12 is forced back toward BDC by a resultant compressive reaction force, thereby causing the crankshaft 3 to turn again in the forward running direction. The crankshaft 3 stops after turning in the forward and reverse directions several times with the pistons 13 in the individual cylinders 12–12D moving up and down in repetitive motion in this way. While positions where the pistons 13 eventually stop at idle engine stop are determined generally by a balance between the compressive reaction forces exerted by the compression stroke cylinder 12 and the expansion stroke cylinder 12, the piston stop positions are more or less affected by mechanical friction occurring in the engine and vary with rotational inertia of the engine, or with the value of the engine speed Ne, at the point in time t4 when the engine goes beyond the compression stroke TDC for the last time.

Therefore, to cause the piston 13 in the expansion stroke cylinder 12 to stop within the aforementioned specified range R suited for restarting the engine, it is necessary to regulate the quantities of air introduced into the expansion stroke cylinder 12 and the compression stroke cylinder 12 in such a manner that these two cylinders 12 produce sufficiently large compressive reaction forces and the compressive reaction force produced by the expansion stroke cylinder 12 is greater than that produced by the compression stroke cylinder 12 by at least a specified amount. To achieve this, the ECU 2 of the present embodiment opens the throttle valve 23 to increase the opening K thereof immediately after fuel injection interruption at the point in time t1 so that specific quantities of air would be drawn into the expansion stroke cylinder 12 and the compression stroke cylinder 12 and, then, closes the throttle valve 23 after a lapse of a specific time period at the point in time t2 to decrease the opening K thereof for regulating the quantities of intake air.

In actuality, however, individual components, such as the throttle valve 23, the intake ports 17 and the branched intake channels 21a, vary in shape from one engine to another and airflows drawn through these components exhibit different behaviors, causing a certain degree of variations in the quantities of air introduced into the individual cylinders 12–12D during the automatic engine stopping period and in the air intake resistance of the engine. In addition, there occurs variations in the mechanical friction in the engine from one engine to another due to differences in their characteristics and in engine temperature. Thus, even if the throttle valve 23 is controlled to open and close as discussed above, it so easy at all to ensure that the pistons 13 in the cylinders 12 which will be on the expansion stroke and on the compression stroke at engine stop will stop at positions exactly within the aforementioned target range R.

In this invention, particular attention is given to the fact that there is a distinct correlation between TOC engine speed no (which is the engine speed Ne measured when the piston 13 in any of the cylinders 12A–12D is at the compression stroke TDC) during a process of gradual engine speed decrease in the automatic engine stopping period and the position where the piston 13 in the cylinder 12 which will be on the expansion stroke at engine stop will stop as shown in the example of FIG. 5. Taking this correlation into account, the ECU 2 detects the engine speed Ne at successive TDCs, or the TDC engine speeds ne, during the aforementioned process of gradual engine speed decrease shown in FIG. 4 after the point in time t1 when the fuel infection is interrupted and adjusts the rate of engine speed decrease by regulating the amount of electric power Ge generated by the alternator 28 according to detected values of the TDC engine speed ne, for instance, during the engine stopping period.

After cutting the fuel injection at the point in time t1 when the engine speed Ne becomes equal to a specified speed, the ECU 2 holds the throttle valve 23 open for a specific time period, during which the ECU 2 measures the engine speed Ne each time the pistons 13 in the individual cylinders 12A–12D successively go beyond the compression stroke TDC while the engine continues to run by inertia. The engine speed Ne thus measured during the specific time period is the aforementioned TDC engine speed ne. The distribution chart of FIG. 5 shows the relationship between the TDC engine speed so measured during the engine stopping period ne and the position where the piston 13 in the expansion stroke cylinder 12 stops at engine stop, the horizontal axis of the chart representing the TDC engine speed ne and the vertical axis of the chart representing the piston stop position. The distribution chart of FIG. 5 showing the relationship between the TDC engine speed ne and the piston stop position of the expansion stroke cylinder 12 is obtained by repeating the aforementioned measurement and plotting cycles during the engine stopping period.

It can been seen from the distribution chart of FIG. 5 that there exists a specific correlation between the TDC engine speed ne and the piston stop position of the expansion stroke cylinder 12 detected during the engine stopping period. It is recognized from the plots of TDC engine speeds ne measured at the sixth to second TDCs from the last TDC that the piston 13 in the cylinder 12 which will be on the expansion stroke at engine stop is likely to stop within the aforementioned specified range R (100° to 120° after TDC, or ATDC, in terms of crank angle) suited for engine restart if the measured TDC engine speeds ne fall within particular ranges shown by hatching in the example of FIG. 5. These ranges shown by hatching in FIG. 5 suited for engine restart are hereinafter referred to as appropriate TDC engine speed ranges R.

Figure 6:
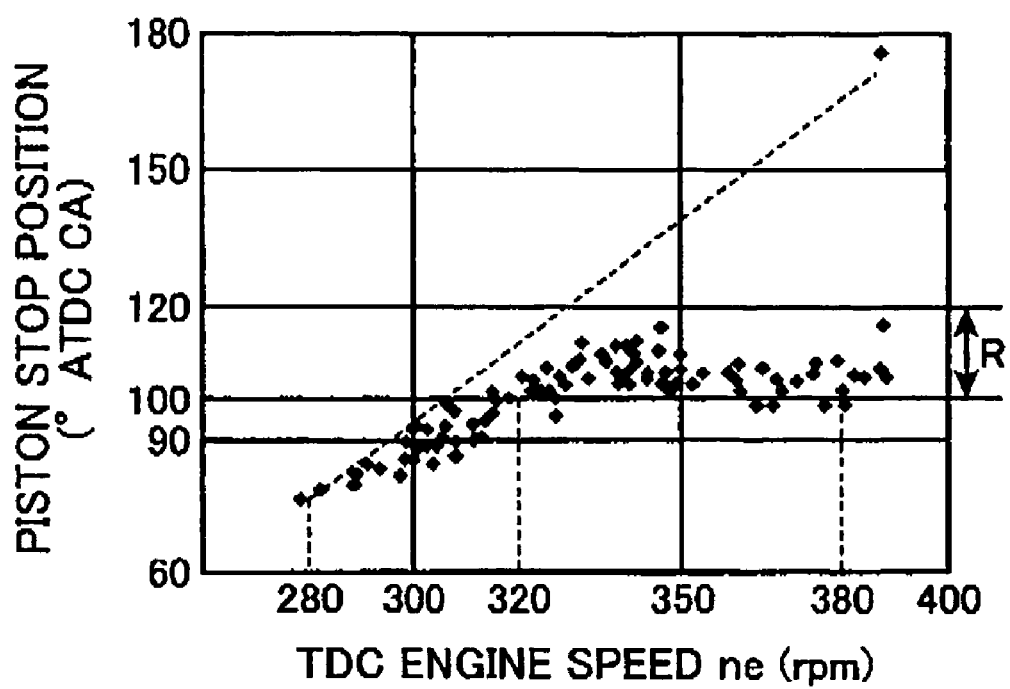
FIG. 6 is a distribution chart showing how the engine speed at TDC is correlated with piston stop position at a second from engine stop.

When particular attention is given to the TDC engine speeds ne at a point of TDC immediately before the last TDC (or at the second TDC from the last TDC) preceding automatic engine atop that corresponds to the engine speed Ne at a point in time t3 of FIG. 4, it can be seen from FIG. 6 that the measured TDC engine speeds ne fall within a range of approximately 280 to 380 rpm, the piston stop position gradually shifting toward the top dead center side (TDC side) with a decrease in the TDC engine speed ne on a lower engine speed side below approximately 320 rpm as shown in FIG. 6. On a higher engine speed side of the TDC engine speed ne equal to or higher than 320 rpm and, on the other hand, the piston stop position remains generally unchanged, falling approximately within the appropriate TDC engine speed range R regardless of whether the TDC engine speed ne is high or low.

A reason for the aforementioned characteristic distribution of the plotted TDC engine speeds ne is supposed to be that, if the TDC engine speed ne is on the higher engine speed side equal to 320 rpm or higher, sufficient quantities of air are filled into the expansion stroke cylinder 12 and the compression stroke cylinder 12 and the compressive reaction forces exerted by the air filled into these cylinders 12 cause their pistons 13 to stop mostly around the middle of the respective strokes. A reason why the plotted piston stop positions are distributed along a line inclined obliquely down leftward on the lower engine speed side at and below 320 rpm is supposed to be that each of the pistons 13 moving up and down turns in the opposite direction near the compression stroke TDC and then stops halfway on the current stroke without returning to a midpoint of the stroke due to deceleration by friction, for instance.

On the other hand, if the throttle valve 23 is kept closed without being opened after fuel injection interruption, the plotted piston stop positions are distributed along a straight broken line inclined obliquely upward to the right as shown in FIG. 6, so that the piston stop position varies with the value of the TDC engine speed ne. This is because if the throttle valve 23 is kept closed, a negative intake air pressure having a large absolute value (in which the intake air pressure is in a low state) is maintained. In this state, the compressive reaction forces exerted by the compression stroke cylinder 12 and the expansion stroke cylinder 12 upon idle engine stop decrease and, as a consequence, mutual influence between the engine speed Ne (rotational inertia) and friction occurring in the engine becomes relatively large.

For reasons stated above, the ECU 2 keeps the opening K of the throttle valve 23 at a relatively large value (e.g. 30% of maximum throttle opening) during a period from the point in time t1 when the fuel injection is interrupted until a specific period of time elapses, or up to the point in time t2 when the engine speed Ne drops to a value equal to or lower than the aforementioned reference engine speed N2 (e.g., approximately 760 rpm), to ensure satisfactory scavenging performance as shown in FIG. 4. At the same time, the ECU 2 sets the amount of electric power Ge generated by the alternator 28 at zero, for instance, to keep the engine speed Ne at a level which permits control operation for stopping the pistons 13 at appropriate (target) positions.

Then, at the point in time t2 when the engine speed Ne becomes equal to or lower than the reference engine speed NZ, the ECU 2 decreases the opening K of the throttle valve 23 and increases the amount of electric power Ge generated by the alternator 28 to make up for the rotational resistance of the crankshaft 3 in order thereby to decrease the engine speed Ne along the experimentally predetermined reference line mentioned earlier. The engine starting system of the embodiment controls the engine at restart in this way such that the sum of kinetic energy possessed by such moving parts as the crankshaft 3, the flywheel, the pistons 13 and connecting rods and potential energy possessed by the air compressed in the compression stroke cylinder 12 would well balance the mechanical friction which will subsequently act on the engine, so that the piston 13 in the expansion stroke cylinder 12 will stop within the aforementioned specified range R suited for restarting the engine.

Figure 7:
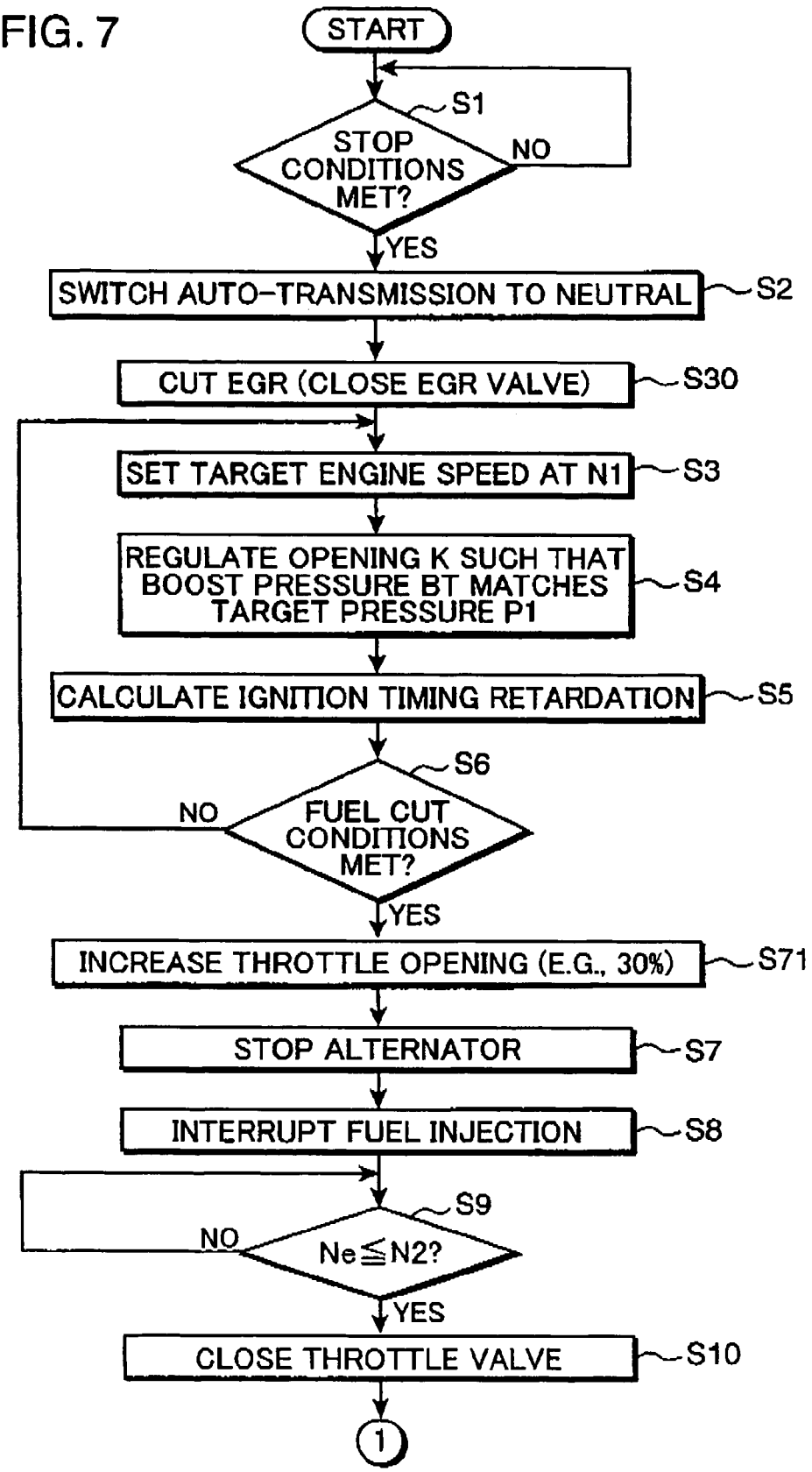
FIG. 7 is a flowchart showing a first part of automatic engine stop control operation of the invention.

The control operation performed by the automatic engine restart controller of the ECU 2 for automatically stopping the engine is now described in detail with reference to flowcharts given in FIGS. 7 and 8. Shown in these flowcharts is a sequence of the automatic engine stop control operation which starts from homogeneous charge combustion conditions in which the in-cylinder air-fuel ratio is set at or in the vicinity of the stoichiometric air-fuel ratio. Immediately following the beginning of this control operation, the ECU 2 judges whether the aforementioned automatic engine stop conditions have been satisfied based on the sensing signals fed from the individual sensors 25, 26, 30–34 in step S1. Specifically, if it is verified that a brake switch has been kept ON for a specific period of time, the amount of charge left in a battery is equal to or more than a predetermined value and the vehicle speed Ne is equal to or less than a specified value (e.g. 10 km/h), the ECU 2 judges that the automatic engine stop conditions have been satisfied, and if any one of these requirements is not satisfied, the ECU 2 judges that the automatic engine stop conditions have not been satisfied.

If fulfillment of the automatic engine stop conditions is verified in step S1 above (Yes in step S1), the ECU 2 switches the automatic transmission to the "neutral" position to bring the engine into a zero-load state in step S2, closes an exhaust gas recirculation (EGR) valve (not shown) provided in an EGR passage to cut recirculation of exhaust gas in step S30, and sets a target value (target engine speed) of the engine speed Ne at a value N1 higher than the aforementioned ordinary idle engine speed (e.g., approximately 850 rpm) in step S3. Also, the ECU 2 regulates the opening K of the throttle valve 23 (or increase the opening K of the throttle valve 23) such that the boost pressure Bt (that is, the pressure at a point in the intake passage 21 downstream of the throttle valve 23 measured by the intake air pressure sensor 26) becomes equal to a target pressure P1 which is set at approximately −400 mmHg, for instance, in step S4, and calculates the amount of retardation of ignition timing in such a way that the engine speed Ne becomes equal to the target engine speed N1 in step S5, With this arrangement, the throttle opening K is fed back for matching the boost pressure Bt to the target pressure P1, and the amount of retardation of ignition timing is fed back for matching the engine speed Ne to the target engine speed N1. This sequence is referred to as engine speed feedback control operation.

In step S1 above, the ECU 2 judges whether the automatic engine stop conditions have been satisfied at a point in time when the vehicle speed becomes equal to or lower than 10 km/h. Thus, upon fulfillment of the automatic engine stop conditions, it is possible to set the idle engine speed at a value (e.g., 850 rpm) higher than the ordinary idle engine speed (e.g., 650 rpm for the "drive" position of the automatic transmission) at which the engine is not caused to automatically stop and carry out steps S2 and S3 before the engine speed Ne drops down to the ordinary idle engine speed (650 rpm). Therefore, it is not necessary to Increase the engine speed Ne up to the target engine speed N1 (850 rpm) after the engine speed Ne has dropped to the ordinary idle engine speed. This arrangement is advantageous in that the engine does not give any noticeable discomfort to the driver or passengers as a result of an increase in engine speed.

When the automatic engine stop conditions have been satisfied in step S2 above, the ECU 2 switches the automatic transmission from the "drive" position to the "neutral" position at the point in time t0 to relieve the automatic transmission from a heavy load and sets the target engine speed at N1. As a consequence, the engine speed Ne increases a little starting at the point in time t0 and stabilizes as depicted in FIG. 4.

Then, the ECU 2 judges in step S6 whether fuel cut conditions (i.e., conditions for interrupting the fuel injection) have been satisfied, that is, whether the engine speed Ne has become equal to the aforementioned target engine speed N1 and the boost pressure Bt has become equal to the aforementioned target pressure P1. If the result of this judgment is in the negative (No in step S6), the ECU 2 returns to step S4 and reexecutes the aforementioned control operation of steps S4 to S6. If the result of this judgment is in the affirmative (Yes in step S6) at the point in time t1 of FIG. 4, the ECU 2 increases the opening K of the throttle valve 23 to a relatively large value (approximately 30%) in step S71, sets the amount of electric power Ge generated by the alternator 28 at zero to interrupt power generation in step S7, and cuts off the fuel injection in step S8. Here, to ensure that all of the fuel already injected into the individual cylinders 12A–12D is burnt even if the fuel injection is cut off, the ECU 2 causes the spark plugs 15 to continue igniting the mixture at least until the end of the period during which the fuel previously injected into the individual cylinders 12A–12D is combusted.

Subsequently, to confirm that the engine speed Ne has begun to decrease upon cutting off the fuel injection at the point in time t1 shown in FIG. 4, the ECU 2 judges in step 59 whether the engine speed Ne has become equal to or less than the reference engine speed N2 which is preset at approximately 760 rpm. Then, at the point in time t2 when the judgment result in step S9 is in the affirmative (Yes in step S9), the ECU 2 causes the throttle valve 23 to close in step S10. As a result, the boost pressure Bt which is regulated to approach atmospheric pressure by opening the throttle valve 23 in steps S4 and S71 begins to drop after a specific time lag from throttle valve closing action.

Next, the ECU 2 judges in step S11 whether the TDC engine speed ne has become equal to or lower than the reference engine speed N2 which is preset at approximately 760 rpm. At a point in time when the TDC engine speed ne is judged to have become equal to or lower than the reference engine speed N2 (Yes in step S11), the ECU 2 begins to perform initial control operation in step S12, in which the ECU 2 sets the amount of electric power Ge to be generated by the alternator 28 at a specific initial value which is predetermined at approximately 60 A and the alternator 28 is operated for a period of about 300 ms.

The engine starting system of the above-described embodiment is structured such that the ECU 2 closes off the throttle valve 23 at the point in time t2 when the engine speed Ne is judged to have become equal to or less than the reference engine speed N2. According to the invention, the foregoing embodiment may be modified in such a fashion that the ECU 2 closes off the throttle valve 23 at a point in time when the TDC engine speed ne is judged to have become equal to or lower than the reference engine speed N2. Also, as an alternative to the above-described structure of the present embodiment in which the ECU 2 closes off the throttle valve 23 at the point in time t2 when the engine speed Ne is judged to have become equal to or less than the reference engine speed N2, the ECU 2 performs the initial control of the amount of electric power Ge at the point in time t2 when the engine speed Ne is judged to have become equal to or less than the reference engine speed N2.

Figure 9:
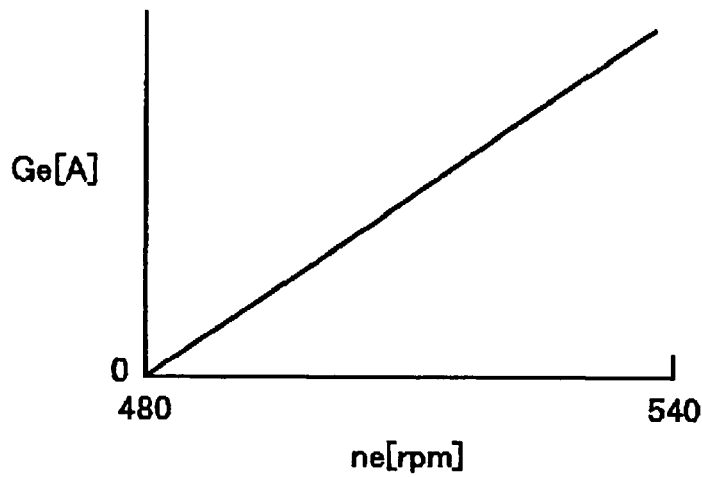
FIG. 9 is a chart showing an example of a map used for setting the amount of electric power to be generated by an alternator according to the engine speed of the invention.

Now, the ECU 2 judges whether the TDC engine speed ne falls within a specified first range α in step S13. This specified first range α, set at a range of 480 to 540 rpm, for instance, is a range of engine speed defined based on the TDC engine speed ne measured at the point in time t3 when the engine goes beyond the fourth compression stroke TDC from engine stop in the aforementioned process of engine speed decrease along the predetermined reference line. If the judgment result in step S13 is in the affirmative (Yes in step S13), it is recognized that the TDC engine speed ne falls within the first range α (480–540 rpm). In this case, the ECU 2 performs control operation in step S14 to regulate the amount of electric power Ge generated by the alternator 28 according to the TDC engine speed ne measured at the point in time t3 when the engine goes beyond the fourth compression stroke TDC from engine stop. More specifically, the higher the TDC engine speed ne, the larger amount of electric power Ge corresponding to the TDC engine speed no is read out of a map as shown in FIG. 9. Using the amount of electric power Ge thus obtained as a target value, the ECU 2 operates the alternator 28 for a period of about 300 ms and thereby controls the amount of electric power Ge generated by the alternator 28.

Next, the ECU 2 judges in step S15 whether the TDC engine speed ne falls within a specified second range β which is preset at a range of 470 to 480 rpm, for instance. In this step, the ECU 2 makes a judgment as to whether the engine speed Ne has markedly dropped. If the result of this judgment is in the affirmative (Yes in step S15), the ECU 2 sets the amount of electric power Ge to be generated by the alternator 28 at such a large value as 100 A as shown by broken lines in FIG. 4 and operates the alternator 28 with this target value to temporarily increase the amount of electric power Ge to be generated by the alternator 28 in step S16.

If the judgment result in step S13 is in the negative (No in step S13) with the TDC engine speed ne not falling within the first range α (480–540 rpm), the ECU 2 skips to step S15 without carrying out the control operation for regulating the amount of electric power Ge generated by the alternator 28 according to the TDC engine speed ne. Also, if the result of this judgment is in the negative (No in step S15) with the TDC engine speed ne not falling within the second range β (470–480 rpm), the ECU 2 skips to step S17 without carrying out the control operation for temporarily increasing the amount of electric power Ge to be generated by the alternator 28.

Subsequently, as the pistons 13 in the individual cylinders 12 successively pass the compression stroke TDCs one after another, the ECU 2 judges whether the TDC engine speed ne is equal to or less than a specified value N3 in step S17. This specified value N3, set at approximately 260 rpm, for instance, is a value corresponding to the engine speed Ne measured when the engine goes beyond the compression stroke TDC for the last time in the aforementioned process of engine speed decrease along the predetermined reference line. Also, the ECU 2 memorizes the boost pressures Bt detected at each point in time when the pistons 13 in the individual cylinders 12A–12D successively go beyond the compression stroke TDC.

If the judgment result in step S17 is in the negative (No in step S17), the ECU 2 returns to step S13 and reexecutes the aforementioned control operation of steps S13 and S17. If the result of this judgment is in the affirmative (Yes in step S17), on the other hand, the ECU 2 determines that the engine has gone beyond the compression stroke TDC for the last time at the point in time t4 when the TDC engine speed ne becomes equal to or less than the specified value N3. Also, at the point in time t4, the ECU 2 reads out the boost pressure Bt detected and memorized at the compression stroke TDC one cycle earlier (i.e., the point in time t3) and determines that this boost pressure Bt is of the second from the last compression stroke TDC before engine stop in step S18.

Based on the TDC engine speed ne detected at the last compression stroke TDC is reached (hereinafter referred to as the final TDC engine speed ne1) and the boost pressure Bt at the second from the last compression stroke TDC before engine stop (hereinafter referred to as the boost pressure Bt2), the ECU 2 judges in step S19 whether there is any increased tendency for each piston 13 to stop closer to a latter part of the current stroke (closer to BDC in the case of the piston stop position of the expansion stroke cylinder 12). Specifically, when the final TDC engine speed ne1 is equal to or higher than a specified engine speed N4 (e.g., 200 rpm) and the boost pressure Bt2 is equal to or less (closer to vacuum) than a first specified pressure P2 (e.g., −200 mmHg), it can be judged that there is an increased tendency for each piston 13 to stop closer to the latter part of the current stroke, which means that the piston stop position of the expansion stroke cylinder 12 tends to become close to 120° within the aforementioned target range R of 100° to 120° ATDC in terms of crank angle.

If the result of this judgment is in the negative (No in step S19), there is not so great a tendency for each piston 13 to stop closer to the latter part of the current stroke but there is a tendency for each piston 13 to stop relatively close to an early part of the current stroke, which means that the piston stop position of the expansion stroke cylinder 12 tends to become close to 100° ATDC or less than 100° ATDC in terms of crank angle within the aforementioned target range R of 100° to 120° ATDC in terms of crank angle.

Under such circumstances, the ECU 2 causes the throttle valve 23 to open such that the piston 13 of the expansion stroke cylinder 12 can stop within the target range R in a reliable fashion. Specifically, the ECU 2 increases the opening K of the throttle valve 23 to achieve the first opening K1 which is set to approximately 40%, for example, and thereby increases the intake air quantity in step S20. In this way, the ECU 2 decreases the air intake resistance of the intake stroke cylinder 12 and makes it easier for each piston 13 to stop closer to the latter part of the current stroke. As a result, it is possible to prevent the piston stop point of the expansion stroke cylinder 12 from occurring at a point ahead of an earlier limit (100° ATDC in terms of crank angle) of the aforementioned target range R (100° to 120° ATDC) and further improve the accuracy of stopping the piston 13 within the target range R.

If the judgment result in step S19 is in the affirmative (Yes in step S19), on the other hand, the engine has a large rotational inertia, the quantity of intake air introduced into the compression stroke cylinder 12 in the final intake stroke is small and the compressive reaction force is low. All these conditions for causing the piston 13 in the compression stroke cylinder 12 to stop closer to the latter part of the current stroke are satisfied in this case. Thus, the ECU 2 regulates the opening K of the throttle valve 23 to match a second opening K2 in step S21, wherein the second opening K2 is close to the opening of the throttle valve 23 achieved when the same is almost closed in step S71, e.g., K2~5%. This second opening K2 of the throttle valve 23 may be a still smaller opening or even zero (fully closed), depending on engine characteristics. In this way, the ECU 2 causes an appropriate level of air intake resistance to occur in the intake stroke cylinder 12 so that the piston 13 would not go further toward the latter part of the current stroke beyond the target range R.

As the engine speed Ne gradually decreases in the aforementioned fashion, the ECU 2 judges in step S22 whether the engine has eventually reached a state of automatic idle stop. If the result of this judgment is in the affirmative (Yes in step S22), then, the ECU 2 completes the aforementioned control operation after executing a piston stop position detecting sequence in a step S23 for detecting stop positions of the pistons 13 based on the sensing signals fed from the earlier-mentioned two crank angle sensors 30, 31 as will be later discussed.

Figure 10:
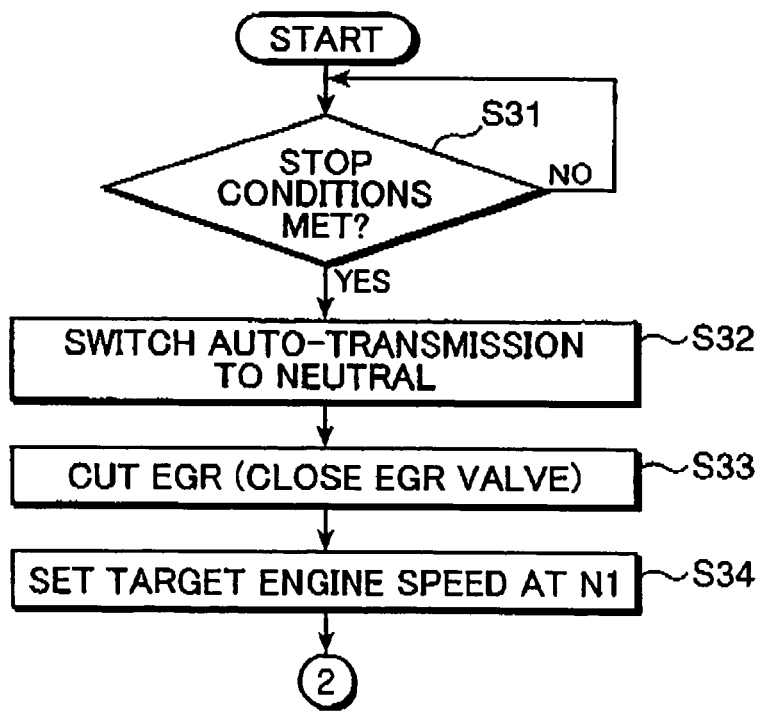
FIG. 10 is a flowchart showing a first part of automatic engine stop control operation in one modified form of the invention.
Figure 11A:
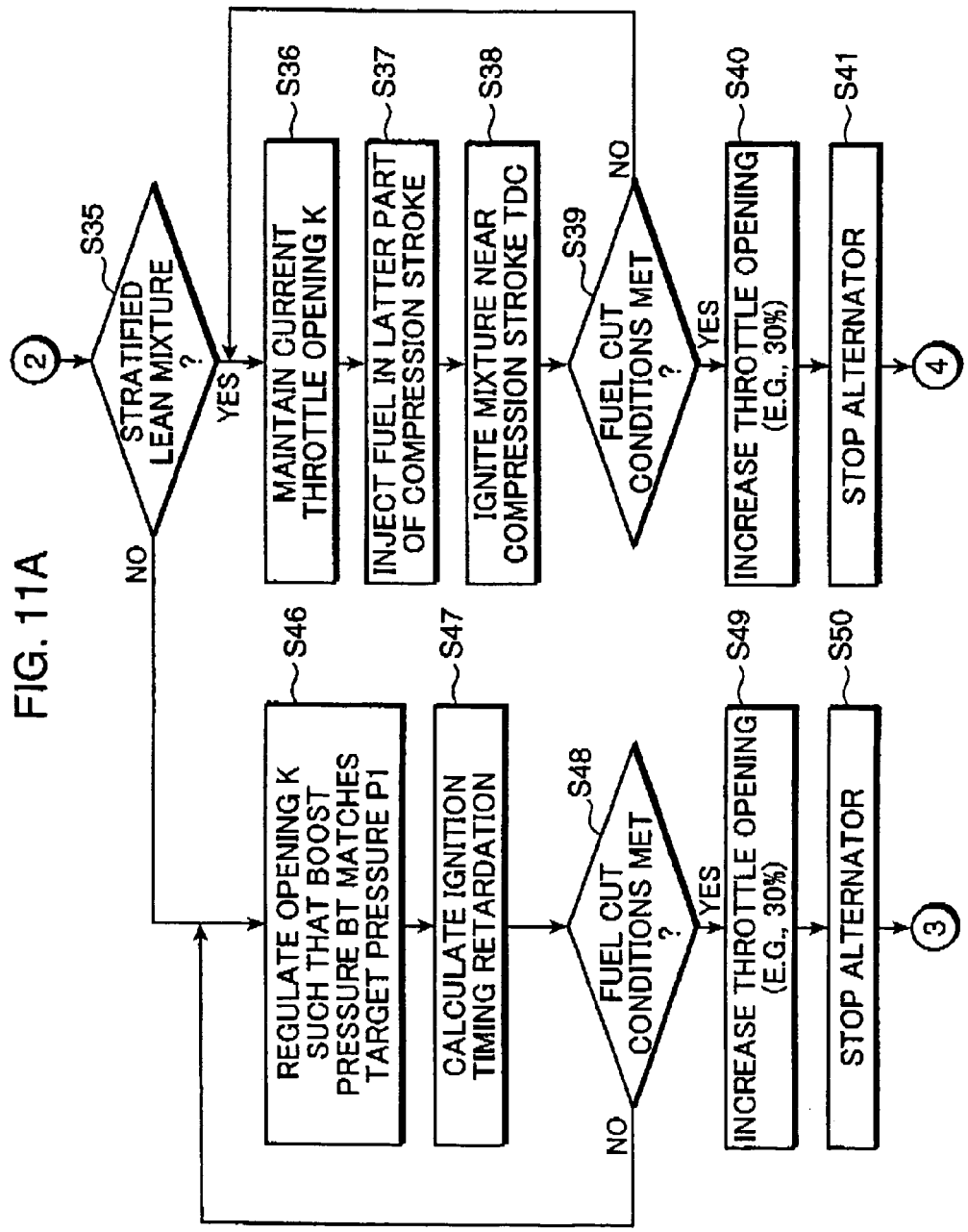
FIG. 11 is a flowchart showing a second part of the automatic engine stop control operation in the modified form of the invention.
Figure 11B:
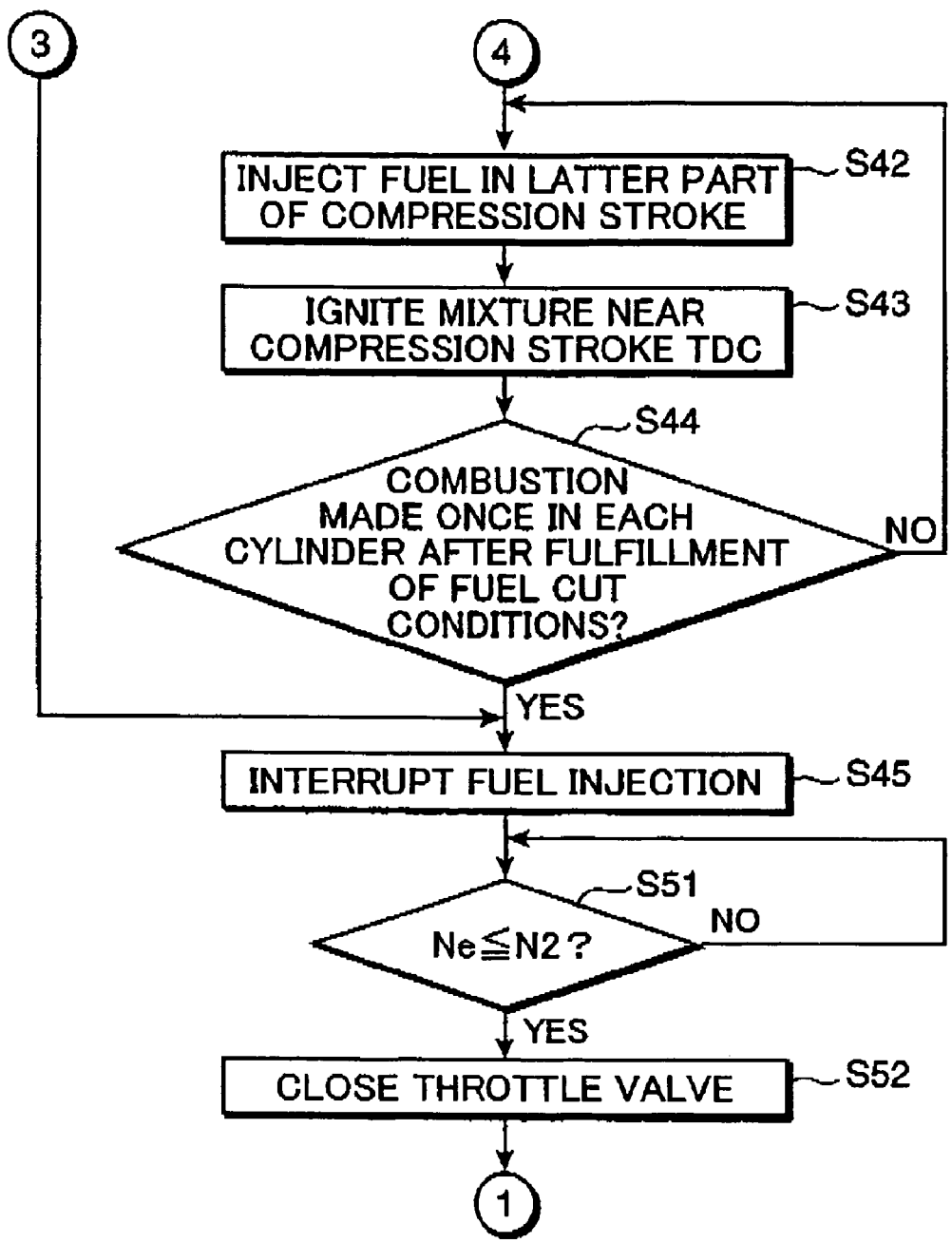

Referring now to flowcharts of FIGS. 10 and 11, control operation performed for automatically stopping the engine under stratified lean mixture operating conditions is described. If it is verified that the automatic engine stop conditions have been satisfied (Yes in step S31), the ECU 2 executes operations of steps S32 through S34 following the beginning of this automatic engine stop control operation as the ECU 2 go through the sequence of steps S1 to S3 in the automatic engine stop control operation of FIG. 7. Specifically, the ECU 2 switches the automatic transmission to the "neutral" position to bring the engine into a zero-load state in step S32, closes the EGR valve (not shown) provided in the EGR passage to cut exhaust gas recirculation in step S33, and sets a target value (target engine speed) of the engine speed Ne at a value N1 higher than the ordinary idle engine speed (e.g., approximately 850 rpm) in step S34.

Next, the ECU 2 judges in step S35 whether the engine is currently under stratified lean mixture operating conditions. If the result of this judgment is in the affirmative (Yes in step S35), the throttle opening K is currently rather large. To be more specific, the throttle opening K is currently set for an air-fuel ratio pretty higher than the stoichiometric air-fuel ratio to permit lean burn operation, the in-cylinder air-fuel ratio being much larger than that for ordinary idle operation performed under conditions of homogeneous charge combustion at the stoichiometric air-fuel ratio or in the vicinity thereof. For example, the throttle opening K is set at 6% to 7% when the in-cylinder air-fuel ratio is about 40 to 50 and the engine speed is about 850 rpm under stratified lean mixture operating conditions. In this case (Yes in step S35), the ECU 2 maintains the current throttle opening K thus set (step S36) and causes the fuel injector 16 of the compression stroke cylinder 12 to inject the fuel in the latter part of the compression stroke in step S37. While the intake air quantity is more or less increased at this point as the exhaust gas recirculation is cut. A change in the air-fuel ratio due to a relative increase in the intake air quantity, if any, is made up for by the quantity of injected fuel.

Subsequently, the ECU 2 causes the spark plug 15 of the compression stroke cylinder 12 to ignite a mixture produced therein in the proximity of the compression stroke TDC in step S38, and judges whether the fuel cut conditions (i.e., conditions for interrupting the fuel injection) have been satisfied in step S39. If the result of this judgment is in the negative (No in step S39), the ECU 2 returns to step S36 and reexecutes the aforementioned control operation of steps S36 to S39.

If the result of this judgment is in the affirmative (Yes in step S39), the ECU 2 increases the opening K of the throttle valve 23 to a relatively large value (approximately 30%) close to a fully open position to purge in-cylinder gases and cause the pistons 13 to stop at appropriate crank angle positions in step S40. Then, the ECU 2 sets the amount of electric power Ge generated by the alternator 28 at zero to interrupt power generation in step S41, causes the fuel injectors 16 of the individual cylinders 12A–12D to inject the fuel in the latter part of the compression stroke of each cylinder 12 in step S42 for producing one-time stratified lean charge combustion therein, and causes each fuel injector 16 to ignite the mixture in the proximity of the compression stroke TDC in step S43. While the mixture burnt by the one-time stratified lean charge combustion produced at this point in time is made much leaner as the throttle valve 23 is opened as mentioned above, the engine is carefully controlled such that the combustion does not result in misfire.

After judging that the fuel cut conditions have been satisfied (Yes in step S39), the ECU 2 makes a further judgment to determine whether the one-time stratified lean charge combustion has been produced in each of the four cylinders 12A–12D In step S44. If the result of this judgment is in the negative (No in step S44), the ECU 2 returns to step S42 to inject the fuel in the latter part of the compression stroke of any cylinder 12 in which combustion has not been produced yet after fulfillment of the fuel cut conditions, and proceeds to step S43 to ignite the mixture in the proximity of the compression stroke TDC.

If the judgment result in step S44 is in the affirmative (Yes in step S44), the ECU 2 interrupts fuel injection at a point in time (step S45) upon verifying that the one-time stratified lean charge combustion has been produced in all of the four cylinders 12A–12D in step S44. Here, to ensure that all of the fuel already injected into the individual cylinders 12A–12D is burnt even if the fuel injection is cut off, the ECU 2 causes the spark plugs 15 to continue igniting the mixture at least until the end of the period during which the fuel previously injected into the individual cylinders 12A–12D is combusted.

Subsequently, the ECU 2 judges in step S51 whether the engine speed Ne has become equal to or less than the reference engine speed N2 which is preset at approximately 760 rpm. If the result of this judgment is in the negative (No in step S51), the ECU 2 repeatedly makes the judgment of step S51 until the engine speed Ne becomes equal to or less than the reference engine speed N2, and at the point in time when the judgment result becomes Yes (the point in time t2 of FIG. 4), the ECU 2 causes the throttle valve 23 to close in step S52 and transfers to step S11 of FIG. 8.

If the result of the judgment in step S35 is in the negative (No in step S35), the engine is not currently under stratified lean mixture operating conditions. If the engine is under homogeneous charge combustion conditions due to a drop in catalyst temperature or a rich spike for refreshing a nitrogen oxide (NOx) catalyst, for example, the ECU 2 proceeds to a sequence of S46 to S50 of FIG. 11 like the sequence of steps S4 to S7 of FIG. 7. Specifically, the ECU 2 regulates the opening K of the throttle valve 23 such that the boost pressure Bt becomes equal to the target pressure P1 which is set at approximately −400 mmHg, for instance, in step S46, and calculates the amount of retardation of ignition timing in such a way that the engine speed Ne becomes equal to the target engine speed N1 in step S47. With this arrangement, the amount of retardation of ignition timing is fed back for matching the engine speed Ne to the target engine speed N1. The idle engine speed is fed back by this engine speed feedback control operation.

Then, the ECU 2 judges in step s48 whether fuel cut conditions (i.e., conditions for interrupting the fuel injection) have been satisfied. If the result of this judgment is in the negative (No in step S48), the ECU 2 returns to step S46 and reexecutes the aforementioned control operation of steps S46 to S48. If the result of this judgment is in the affirmative (Yes in step S48), the ECU 2 increases the opening K of the throttle valve 23 to a relatively large value (approximately 30%) close to the fully open position to purge in-cylinder gases and cause the pistons 13 to stop at appropriate crank angle positions in step S49. Then, the ECU 2 sets the amount of electric power Ge generated by the alternator 28 at zero to interrupt power generation in step S50, and proceeds to step S45, in which the ECU 2 interrupts fuel injection and causes the spark plugs 15 to continue igniting the mixture at least until the end of the period during which the fuel previously injected into the individual cylinders 12A–12D is combusted.

Figure 8:
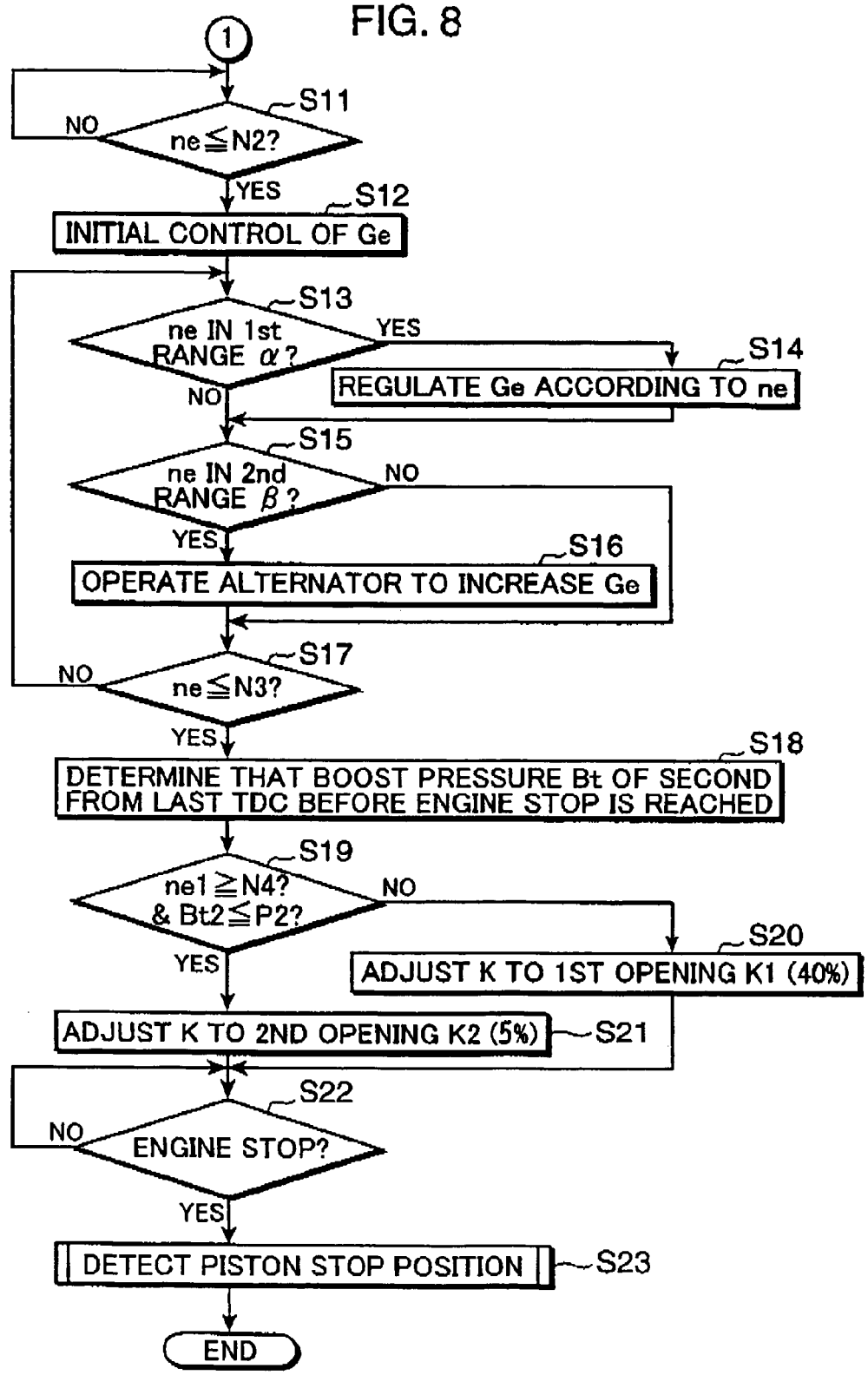
FIG. 8 is a flowchart showing a second part of the automatic engine stop control operation.
Figure 12:
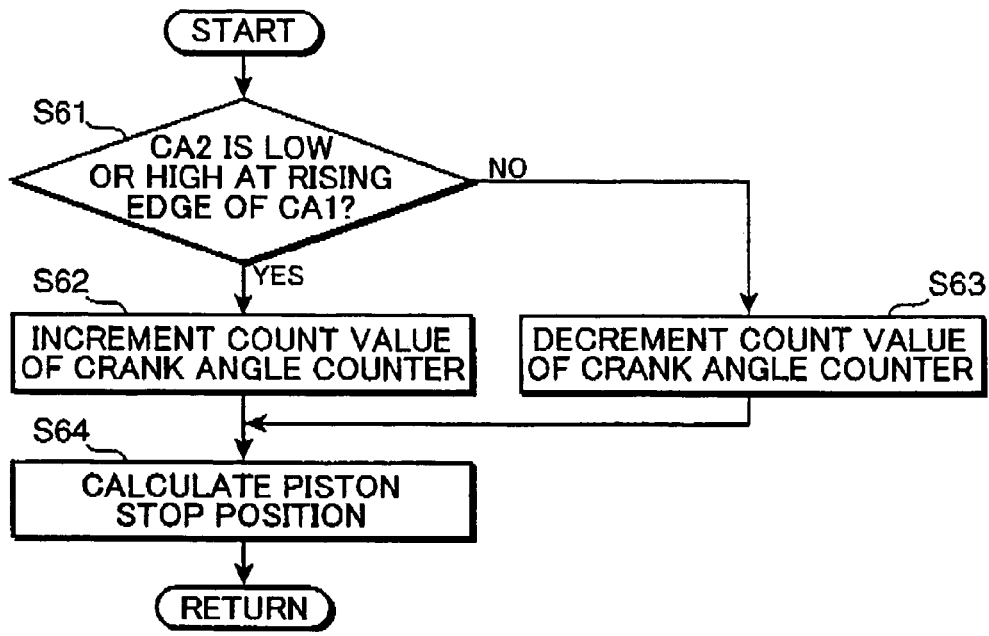
FIG. 12 is a flowchart showing a piston stop position detecting sequence executed in a subroutine of FIG. 8.

FIG. 12 is a flowchart showing the piston stop position detecting sequence executed in the subroutine of step S24 shown in FIG. 8. After the piston stop position detecting sequence has begun, the ECU 2 first judges in step S61, based on the first crank angle signal CA1 output from the first crank angle sensor 30 and the second crank angle signal CA2 output from the second crank angle sensor 31, whether the second crank angle signal CA2 is Low at each rising edge of the first crank angle signal CA1 and High at each falling edge of the first crank angle signal CA1, or whether the second crank angle signal CA2 is Low at each falling edge of the first crank angle signal CA1 and High at each rising edge of the first crank angle signal CA1. In other words, the ECU 2 judges in step S61 whether the first and second crank angle signals CA1, CA2 are phase-offset as shown in a time chart of FIG. 13A indicating that the crankshaft 3 (engine) is turning in the forward direction or the first and second crank angle signals CA1, CA2 are phase-offset as shown in a time chart of FIG. 13B indicating that the crankshaft 3 (engine) is turning in the reverse direction.

Figure 13A:
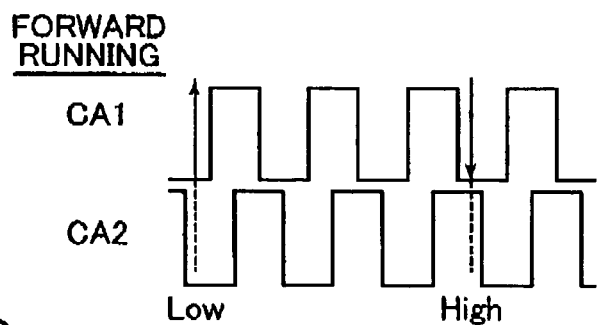
FIGS. 13A and 13B are time charts showing how crank angle signals output from a pair of crank angle sensors are correlated in phase.
Figure 13B:
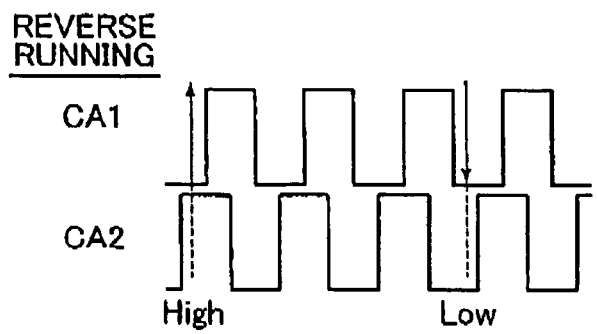

More specifically, when the engine runs in the forward direction, the second crank angle signal CA2 lags the first crank angle signal CA1 in phase by about half the pulse-length and, therefore, the second crank angle signal CA2 becomes Low at the rising edge of each successive pulse of the first crank angle signal CA1 and High at the falling edge of each successive pulse of the first crank angle signal CAL as shown in FIG. 13A. When the engine runs in the reverse direction, on the contrary, the second crank angle signal CA2 leads the first crank angle signal CA1 in phase by about half the pulselength and, therefore, the second crank angle signal CA2 becomes High at the rising edge of each successive pulse of the first crank angle signal CA1 and Low at the falling edge of each successive pulse of the first crank angle signal CA1 as shown in FIG. 13B.

If the engine is judged to be running in the forward direction (Yes in step S61), the ECU 2 increments a count value of a crank angle counter for measuring changes in the crank angle in step S62. If the engine is judged to be running in the reverse direction (No in step S61), on the contrary, the ECU 2 decrements the count value of the crank angle counter in step S63. After the engine has stopped, the ECU 2 determines the piston stop position by examining the count value of the crank angle counter in step S64.

Now, engine restart control operation performed by the ECU 2 for restarting the engine which has automatically stopped in the aforementioned manner is described with reference to a flowchart given in FIG. 14 and the time charts of FIGS. 13A and 13B. Shown in FIGS. 13A and 13B and FIG. 14 is an example in which the first cylinder 12A becomes an expansion stroke cylinder, the third cylinder 12C becomes a compression stroke cylinder, the fourth cylinder 12D becomes an intake stroke cylinder, and the second cylinder 125 becomes an exhaust stroke cylinder at engine stop.

First, the ECU 2 judges in step S101 whether the predefined conditions for engine restart mentioned earlier, or engine restart conditions, have been satisfied. If none of these engine restart conditions have been satisfied yet (No in step S101), the ECU 2 waits until the conditions are satisfied. When the accelerator pedal has been depressed for restarting the vehicle from idle stop or battery voltage has dropped, for instance, the ECU 2 judges that the engine restart conditions have been satisfied (Yes in step S101) and, in this case the ECU 2 calculates the quantities of air in the compression stroke cylinder 12C and the expansion stroke cylinder 12A based on the stop positions of the pistons 13 determined in the aforementioned stop position detecting subroutine (FIG. 12) in step S102. More specifically, the ECU 2 calculates current volumes of the combustion chambers 14 in the compression stroke cylinder 12C and the expansion stroke cylinder 12A from the stop positions of the pistons 13. Further, the ECU 2 determines the quantities of fresh air In the compression stroke cylinder 12C and the expansion stroke cylinder 12A based on the fact that the individual cylinders 12A–12D Including the expansion stroke cylinder 12A are filled almost entirely with fresh air since the engine stops upon turning several times after fuel injection interruption at idle engine stop and that the interior of the compression stroke cylinder 12C and the expansion stroke cylinder 12A is generally at atmospheric pressure at engine stop as stated earlier.

In succeeding step S103, the ECU 2 causes the fuel injector 16 of the compression stroke cylinder 12C to inject the fuel in such a quantity that produces a specific air-fuel ratio, or a first air-fuel ratio, for the compression stroke cylinder 12C with the quantity of air therein calculated in step S102 above. Then, in step S104, the ECU 2 causes the fuel injector 16 of the expansion stroke cylinder 12A to inject the fuel to produce a specific air-fuel ratio for the expansion stroke cylinder 12A with the quantity of air therein calculated in step S102 above. These air-fuel ratios for the compression stroke cylinder 12C and the expansion stroke cylinder 12A are determined from maps M1, M2 which are preprogrammed according to the respective piston stop positions. These maps M1, M2 are preprogrammed in such a way that the first air-fuel ratio for the compression stroke cylinder 12C is set at a value lower than the stoichiometric air-fuel ratio (preferably within a range of 11 to 14), while the air-fuel ratio for the expansion stroke cylinder 12A is set at a value equal to or slightly lower than the stoichiometric air-fuel ratio.

In succeeding step S105, the ECU 2 causes the spark plug 15 of the compression stroke cylinder 12C to ignite a mixture produced therein after a lapse of a particular time period which is preset in consideration of fuel evaporation time required after fuel injection into the compression stroke cylinder 12C. Then, in step S106, the ECU 2 judges whether the piston 13 in the compression stroke cylinder 12C has moved or not based on whether any of the rising and falling edges of the crank angle signals CA1, CA2 output from the crank angle sensors 30, 31 has been detected within a specific time from ignition in step S105. If the piston 13 in the compression stroke cylinder 12C has not moved (No in step S106) due to misfire, for instance, the ECU 2 proceeds to step S107, in which the ECU 2 causes the spark plug 15 of the compression stroke cylinder 12C to reignite the mixture.

If any of the rising and falling edges of the crank angle signals CA1, CA2 output from the crank angle sensors 30, 31 has been detected (Yes in step S106), the ECU 2 proceeds to step S108, in which the ECU 2 causes the spark plug 15 of the expansion stroke cylinder 12A to ignite a mixture produced therein after a lapse of a specific ignition delay time from a point of edge detection, that is, after a specific period of time during which reversing action of the engine finishes elapses. The ignition delay time mentioned above is determined from a map M3 which is preprogrammed according to the stop position of the piston 13. Further, when a specific crank angle, or a second fuel injection point, for the compression stroke cylinder 12C is reached, the ECU 2 proceeds to step S109, in which the ECU 2 causes the fuel injector 16 of the compression stroke cylinder 12C to reinject the fuel. In executing this step S109 of the second fuel injection, the ECU 2 determines a second air-fuel ratio for the compression stroke cylinder 12C from a map M4 which is preprogrammed according to the stop position of the piston 13 and, then, based on the second air-fuel ratio thus obtained, the ECU 2 determines the quantity of fuel to be injected into the compression stroke cylinder 12C. At the same time, the ECU 2 determines from a map M5 an appropriate fuel injection point for the compression stroke cylinder 12C. Specifically, as the fuel injected into the compression stroke cylinder 12C evaporates, in-cylinder gas temperature decreases due to absorption of latent heat by evaporation of the injected fuel. The ECU 2 sets the appropriate fuel injection point at a point where this in-cylinder temperature drop contributes to a decrease in compressive force exerted by the compression stroke cylinder 12C. More specifically, the ECU 2 sets the appropriate fuel injection point at an appropriate point in a range of time from a middle part of the compression stroke to an early half of the latter part of the compression stroke.

The second air-fuel ratio is set at a properly rich-mixture air-fuel ratio at which the effect of latent heat absorption increases. Reinjection of the fuel (second fuel injection) into the compression stroke cylinder 12C serves to decrease the compressive force at about the compression stroke TDC of the compression stroke cylinder 12C, and this makes it possible for the piston 13 in the compression stroke cylinder 12C to go beyond the compression stroke TDC by the combustion produced in the expansion stroke cylinder 12A due to the ignition in step S108 above. Upon completion of the aforementioned engine restart control operation, the ECU 2 proceeds to step S110 and returns to normal engine control operation.

Figure 15:
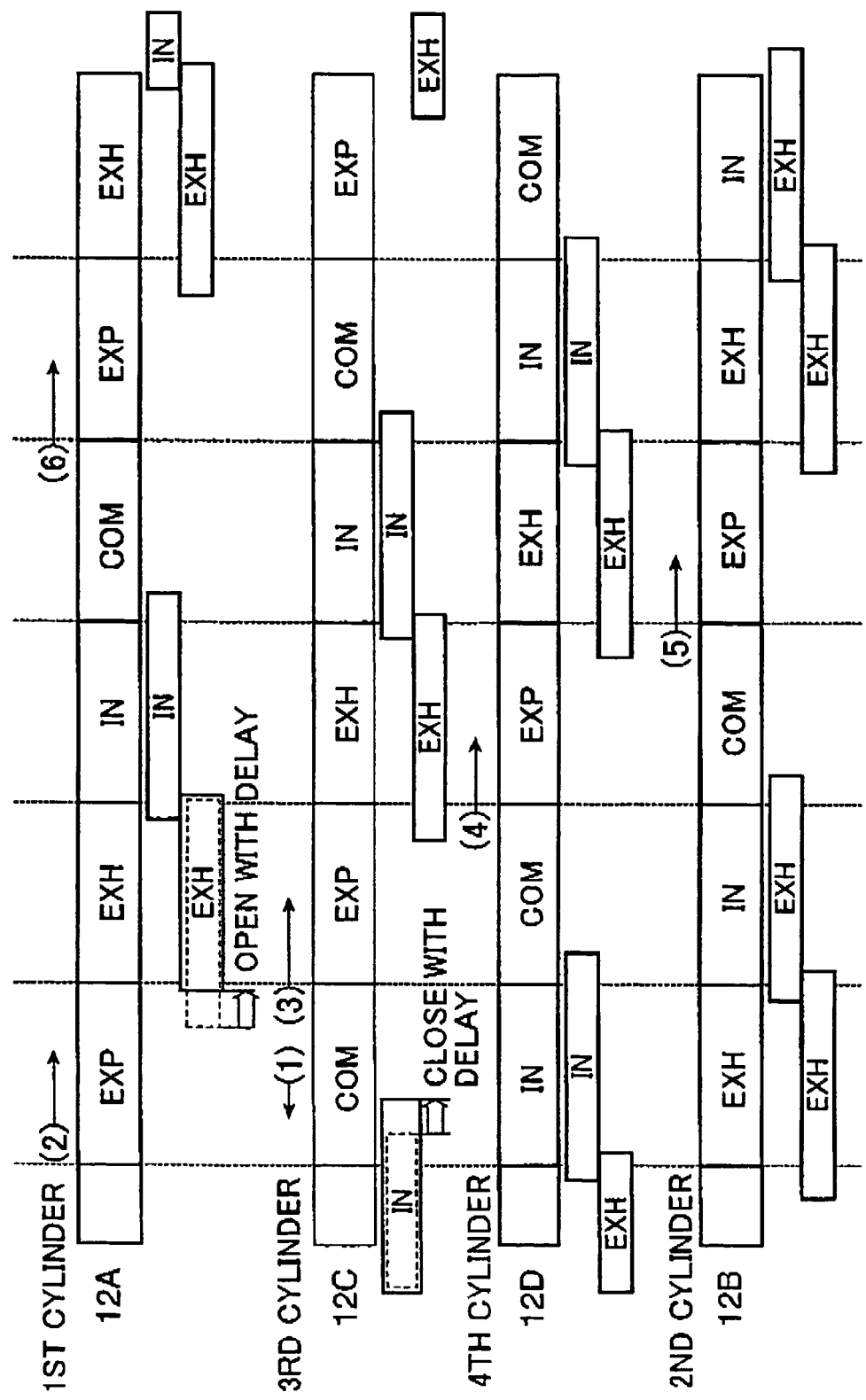
FIG. 15 is a time chart showing a sequence of combustion cycles and related operations of the engine starting system performed during the engine restart control operation.
Figure 16:
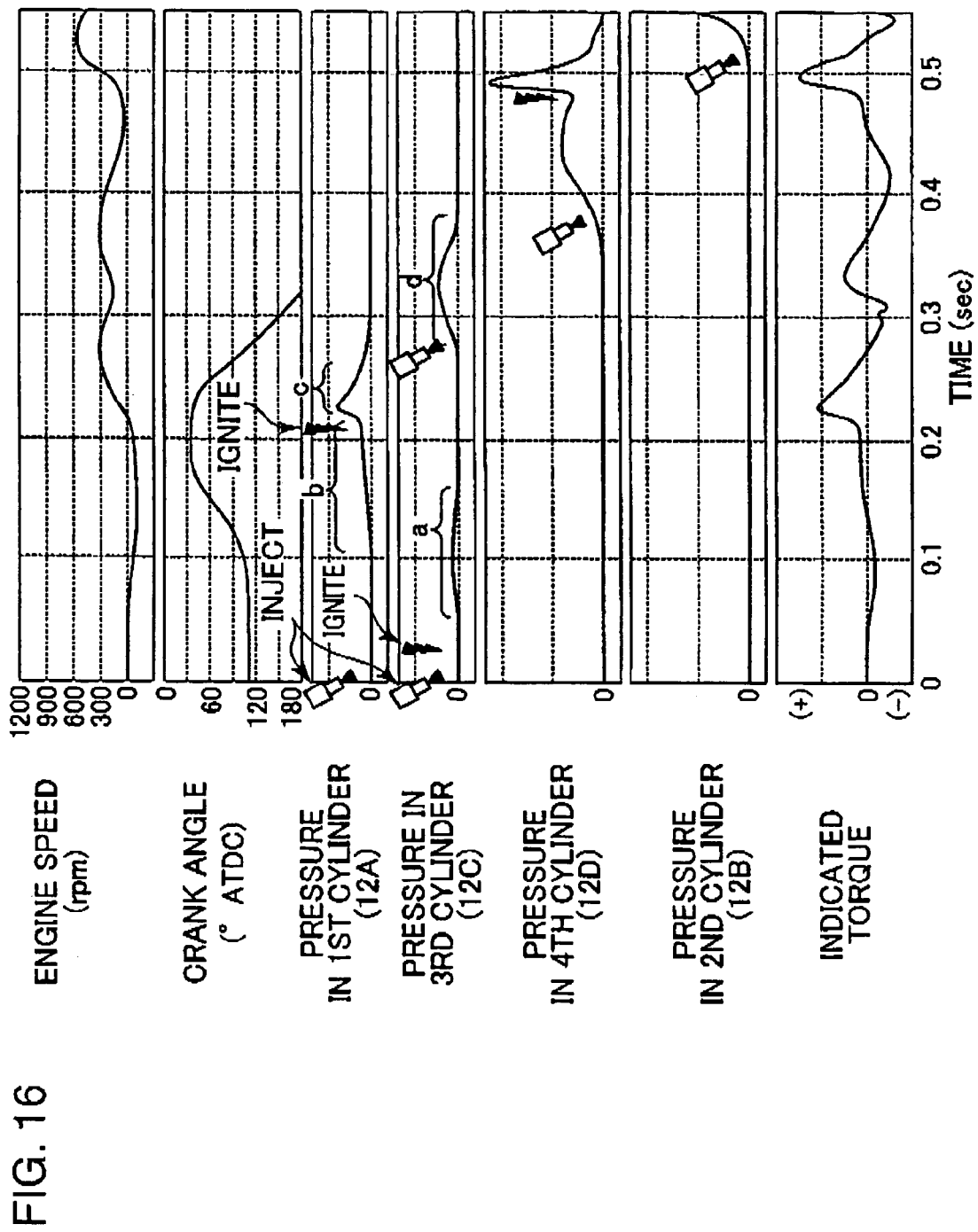
FIG. 16 is a time chart showing how the engine works, such as how the engine speed varies, during the engine restart control operation.

In carrying out the engine restart control operation as discussed above, the engine starting system of the present embodiment controls the engine as Illustrated in FIGS. 15 and 16. Specifically, the ECU 2 causes initial combustion, marked by (1) in FIG. 15, to occur in the compression stroke cylinder (third cylinder) 12C at a rich-mixture air-fuel ratio slightly lower than the stoichiometric air-fuel ratio. With the aid of a combustion pressure (part "a" shown in FIG. 16) produced by this combustion (1), the piston 13 of the compression stroke cylinder 12C is forced down toward BDC, which causes the engine to run in the reverse direction. Consequently, the piston 13 in the expansion stroke cylinder (first cylinder) 12A approaches TDC, so that air in the cylinder 12A is compressed resulting in an increase in in-cylinder pressure (part "b" shown in FIG. 16). At a point in time when the piston 13 in the expansion stroke cylinder 12A has sufficiently approached TDC, the ECU 2 ignites the fuel already injected into the expansion stroke cylinder 12A to cause combustion therein, marked by (2) in FIG. 15, thereby driving the engine to run in the forward direction with a resultant combustion pressure (part "c" shown in FIG. 16). Subsequently, the ECU 2 causes the fuel injector 16 of the compression stroke cylinder 11C to inject the fuel with proper timing, marked by (3) in FIG. 15. Although the fuel thus injected into the compression stroke cylinder 12C is not burned in this cylinder 12C, the injected fuel serves to reduce the compressive force exerted by the compression stroke cylinder 12C due to the effect of latent heat absorption (part "d" shown in FIG. 16). Therefore, engine driving force is maintained by the aforementioned combustion in the expansion stroke cylinder 12A up to a point where the piston 13 goes beyond the second compression stroke TDC from the beginning of the engine restart operation. In other words, the engine driving force is maintained until additional engine driving force is given by combustion in the intake stroke cylinder (fourth cylinder) 12D.

With the air-fuel ratio in the compression stroke cylinder 12C made slightly lower than the stoichiometric air-fuel ratio to produce a richer mixture as mentioned above, it is possible to produce an enhanced engine driving force and execute engine reversing operation in a satisfactory fashion. Thus, the in-cylinder pressure of the expansion stroke cylinder 12A is increased and a sufficiently high level of combustion torque (engine driving force) can be generated.

Also, the ECU 2 performs fuel injection into the compression stroke cylinder 12C particularly for reducing the compressive force exerted thereby. This serves to ensure reliable engine restart by the combustion in the expansion stroke cylinder 12A.

Furthermore, since the fuel injection point for the intake stroke cylinder 12D is set at a point, marked by (4) in FIG. 15 in the middle part of the compression stroke or later, for example, appropriate for reducing the in-cylinder temperature and the compressive force by the effect of latent heat absorption by the injected fuel, it is possible to prevent autoignition (spontaneous combustion) in the compression stroke of the initially intake stroke cylinder 120, i.e., before the compression stroke TDC. Also, since the ignition point for the intake stroke cylinder 12D is set at a point corresponding to the compression stroke TDC or later, it is possible to prevent combustion in the intake stroke cylinder 12D before the compression stroke TDC. Moreover, the aforementioned arrangement of the embodiment serves to enhance forward running engine operating efficiency while reducing the compressive reaction force.

Upon completion of the engine restart control operation at step S109 already discussed, the engine transfers to the normal engine control operation (step S110) in which the individual cylinders 12A–12D undergo successive combustion cycles, marked by (5), (6) and so on in FIG. 15.

As thus far described, the engine provided with the engine starting system of the present embodiment includes the fuel injection controller (included in the ECU 2 in the embodiment) for controlling the quantity of fuel to be injected by the fuel injector 16 directly into each cylinder 12 and the fuel injection timing thereof, the ignition controller (included in the ECU 2 in the embodiment) for controlling the ignition timing of spark plugs of the individual cylinders 12A–12D, the intake air quantity regulator (throttle valve 23) for regulating the quantity of air introduced into the cylinders 12A–12D, the alternator 28 driven by the engine, and the rotating speed sensing device serving as the engine speed sensor (i.e., a combination of the crank angle sensors 30 and 31) for detecting the engine speed. The engine starting system includes in the ECU 2 the automatic engine stop controller for automatically stopping the engine by interrupting fuel injection from the fuel injectors 16 necessary for keeping the engine running when the predefined automatic engine stop conditions are satisfied, and the automatic engine restart controller for automatically restarting the engine by causing the fuel injector 16 of at least one of the cylinders 12A–12D which is on the expansion stroke at engine stop and causing the spark plug 15 of that cylinder 12 to ignite a mixture produced therein when the predefined engine restart conditions are satisfied.

The automatic engine stop controller sets the quantity of intake air regulated by the aforementioned intake air quantity regulator at a level higher than the minimum quantity of intake air necessary for keeping the engine running by a specific amount and sets a scavenging mode period (which corresponds to the period from t1 to t2 of FIG. 4 in this embodiment) for expelling in-cylinder exhaust gas by decreasing the amount of electric power Ge generated by the alternator 28 prior to fulfillment of the automatic engine stop conditions in an early part of the automatic engine stop control operation. This arrangement serves to efficiently improve the scavenging performance of the engine at automatic engine stop. Further, since the automatic engine stop controller causes the alternator 28 to decrease the amount of electric power Ge generated thereby during the scavenging mode period as stated above, the engine starting system of the embodiment can improve the exhaust gas scavenging performance while preventing an excessive drop in the engine speed at automatic engine stop.

On the other hand, the automatic engine restart controller decreases the opening K of the throttle valve 23 at the point in time t2 when the engine speed Ne becomes equal to or lower than the reference engine speed N2 (approximately 760 rpm in this embodiment) to decrease the quantity of intake air and, at the same time, and increases the amount of electric power Ge generated by the alternator 28 to increase the rotational resistance of the crankshaft 3. As the automatic engine restart controller closes the throttle valve 23 at an appropriate point in time by controlling the engine in this way to regulate the quantity of intake air such that the quantity of air introduced into the expansion stroke cylinder 12 which is on the expansion stroke at idle stop become larger than the quantity of air introduced into the cylinder 12 which is on the compression stroke at idle stop, it is possible to ensure that the piston 13 in the expansion stroke cylinder 12 will stop within the aforementioned specified range R suited for restarting the engine. It is to be noted in this connection that the amount of electric power Ge generated by the alternator 28 must be increased in the initial stage of the automatic engine stop control operation when the engine speed Ne is lower than 360 rpm. This is because the alternator 28 can not generate a sufficient amount of electric power if the engine speed Ne is lower than 360 rpm and, as a result, it is not possible to increase the rotational resistance of the crankshaft 3 so much that the engine speed Ne can not be efficiently regulated even if the target value of the amount of electric power Ge to be generated by the alternator 28 is increased.

The automatic engine stop controller of the engine starting system of the foregoing embodiment detects the TDC engine speed ne at a point in time when a specific period of time has elapsed after the fuel injection is interrupted when the engine speed Ne reaches the predetermined reference engine speed N2 by the automatic engine stop control operation, or at the point in time t3 when it is verified that the engine has gone beyond the fourth compression stroke TDC from engine stop. The automatic engine stop controller reads out the amount of electric power Ge corresponding to the TDC engine speed ne thus detected from the map shown in FIG. 9, for example, and thereby sets the amount of electric power Ge to be generated by the alternator 28 at a larger value when the detected TDC engine speed ne is high than when the detected TDC engine speed ne is low. As the automatic engine stop controller is so structured, it is possible to properly control the amount of electric power Ge generated by the alternator 28 in such a way that the engine speed Ne the engine speed Ne would decrease along the predetermined reference line. More particularly, the automatic engine stop controller regulates the amount of electric power Ge to be generated by the alternator 28 based on the TDC engine speed no measured at the point in time t3 when the engine goes beyond the fourth compression stroke TDC from engine stop so that the measured TDC engine speeds ne fall within the ranges shown by hatching in the example of FIG. 5 and the piston 13 in the cylinder 12 which will be on the expansion stroke at engine stop will stop at a position suited for engine restart.

Since the engine starting system of the foregoing embodiment is structured in such a fashion that the amount of electric power Ge generated by the alternator 28 will temporarily rise at the point in time t2 when it is verified that the engine speed Ne has dropped to the predetermined reference engine speed N2 during the automatic engine stop control operation, it is possible to promptly decrease the engine speed Ne so that the engine speed Ne would drop along the predetermined reference line. Also, the engine starting system regulates the decrease rate of the engine speed Ne by controlling the amount of electric power Ge generated by the alternator 28 according to the TDC engine speed ne detected thereafter. It is therefore possible to cause the pistons 13 to stop at positions suited for engine restart in an efficient manner.

Also, if the engine starting system is so structured as to regulate the amount of electric power Ge generated by the alternator 28 according to the TDC engine speed no detected when the engine speed Ne becomes temporarily stabilized after the piston 13 in the compression stroke cylinder 12 has gone beyond the compression stroke TDC, there arises an advantageous effect that the decrease rate of the engine speed Ne can be accurately adjusted by properly controlling the amount of electric power Ge.

Further, the engine starting system of the foregoing embodiment is structured in such a fashion that if it is verified that the engine speed Ne has significantly dropped based on the decrease rate of the engine speed Ne detected at a point in time when a specific period of time has elapsed (or at the point in time of the second compression stroke TDC from engine stop) after the engine speed Ne has dropped to the predetermined reference engine speed N2 after fuel injection interruption for automatically stopping the engine, the amount of electric power Ge generated by the alternator 28 is temporarily increased as shown by broken lines in FIG. 4 based on the judgment that the engine has stopped too earlier than indicated by the predetermined reference line. This arrangement is advantageous in that it is possible to prevent the pistons 13 from stopping at inappropriate positions due to too large a decrease rate of the engine speed Ne.

Also, used in the engine of which ordinary idle engine speed is 650 rpm (with the automatic transmission set at the "drive" position) at which the engine is not automatically stopped, the engine starting system of the foregoing embodiment is so structured as to set the target engine speed N1 at a value of approximately 850 rpm, for example, which is higher than the ordinary idle engine speed (with the automatic transmission set at the "neutral" position) at the point in time t1 when the fuel injection is interrupted. As the engine starting system is thus structured, it is possible to cause the engine speed Ne to decrease along the predetermined reference line by increasing the engine speed Ne (i.e., the number of intake, compression, expansion and exhaust strokes) after the fuel injection interruption, and properly perform the automatic engine stop control operation in which the pistons 13 are caused to stop within the appropriate TDC engine speed ranges R suited for engine restart by regulating the opening K of the throttle valve 23 and the amount of electric power Ge generated by the alternator 28 to adjust the rotational resistance of the crankshaft 3 in the aforementioned process of decreasing the engine speed Ne.

Also, if the engine starting system is so structured as to set the amount of electric power Ge generated by the alternator 28 at zero at the point in time t1 when the fuel injection is interrupted upon fulfillment of the automatic engine stop conditions as shown in the foregoing discussion of the embodiment, there arises an advantageous effect that it is possible to properly perform the automatic engine stop control operation while preventing the engine speed Ne from excessively dropping after the fuel injection interruption.

Also, used in the engine of which ordinary idle engine speed is 650 rpm at which the engine is not automatically stopped, the engine starting system of the foregoing embodiment is so structured as to maintain the engine speed Ne at a high level by performing the engine speed feedback control operation with the target engine speed N1 set at a value (e.g., 850 rpm) higher than the ordinary idle engine speed at the point in time t0 when the automatic engine stop conditions are satisfied and to interrupt the fuel injection upon stabilizing engine operating conditions by controlling the intake air quantity regulator (throttle valve 23) such that the boost pressure Bt is kept at a fixed value. The engine starting system thus structured makes it possible to cause the pistons 13 to stop within the appropriate TDC engine speed ranges R suited for engine restart by properly executing the automatic engine stop control operation to decrease the engine speed Ne along the predetermined reference line.

Further, the engine starting system of the foregoing embodiment is so structured as to switch the automatic transmission to the "neutral" position at the point in time t0 when the automatic engine stop conditions are satisfied. This arrangement is advantageous in that it is possible to properly perform the automatic engine stop control operation for causing the pistons 13 to stop at positions suited for engine restart by interrupting the fuel injection so that the engine speed Ne drops along the predetermined reference line under conditions where fluctuation in the engine speed Ne due to disturbances fed into the engine body 1 through the automatic transmission is suppressed.

Also, the engine starting system of the foregoing embodiment is structured such that the ECU 2 causes the spark plugs 15 to continue igniting the mixture as long as the fuel injected into the individual cylinders 12A–12D can burn, that is, at least until the period during which the fuel injected into the cylinders 12A–12D can be combusted elapses. This arrangement serves to prevent unburned gas from being left in the cylinders 12A–12D in a reliable fashion.

Also, the engine starting system of the foregoing embodiment is so structured as to perform control operation for reducing the quantity of intake air and increasing the amount of electric power Ge generated by the alternator 28 at the point in time t2 when the engine speed Ne has dropped down to the reference engine speed N2 (e.g., 760 rpm) which is set later than the point in time t1 fuel injection interruption at a value lower than the target engine speed N1 (e.g., 850 rpm) set at the point in time t1. As the engine starting system sets not only the target engine speed N1 but also the engine speed Ne at a value higher than the ordinary idle engine speed (e.g., 650 rpm) in the aforementioned manner, it is possible to produce the effect of improving the accuracy of piston stop positions and enhancing the exhaust gas scavenging performance in a yet reliable fashion.

Also, the engine starting system of the foregoing embodiment is so structured as to judge whether there is any tendency for each piston 13 to stop closer to a latter part of the current stroke based on the final TDC engine speed ne1 detected at the point in time t4 when each piston 13 reaches the last compression stroke TDC and to regulate the opening K of the throttle valve 23 according to the result of this judgment. This arrangement makes it possible to properly perform the automatic engine stop control operation for adjusting the distance traveled by each piston 13 on a stroke immediately before engine stop and thereby stopping each piston 13 within the range R suited for engine restart.

For example, the engine starting system judges whether there is a tendency for a piston 13 to stop closer to the latter part of the current stroke based on whether the engine satisfies such conditions that the final TDC engine speed ne1 Is equal to or higher than 200 rpm and the boost pressure Bt2 is equal to or less than the first specified pressure P2 (=–200 mmHg). If the result of this judgment is in the negative, the engine starting system increases the opening K of the throttle valve 23 to achieve the predetermined first opening K1 which Is set to approximately 40%, for example, and thereby decrease the air intake resistance of the intake stroke cylinder 12 and prevent the piston stop point of the expansion stroke cylinder 12 from occurring at a point ahead of the earlier limit (lower limit) of the aforementioned target range R. If the judgment result is in the affirmative, on the other hand, the engine starting system regulates the opening K of the throttle valve 23 to match the second opening K2 which is set to approximately 5%, for example, so that an appropriate level of air intake resistance occurs in the intake stroke cylinder 12 to prevent the piston 13 from going further toward the latter part of the current stroke beyond the target range R.

While the foregoing discussion of the embodiment has illustrated an example in which the engine starting system produces a first air-fuel ratio lower than the stoichiometric air-fuel ratio in the compression stroke cylinder 12C at engine restart, the invention is not limited to this arrangement. For example, the engine starting system may restart the engine in such a manner that the first air-fuel ratio is higher than the stoichiometric air-fuel ratio by a specific amount so that excess oxygen would be left unused in the cylinders 12A–12D, the fuel is injected into the cylinder 12 on the true compression stroke after the engine begins to run in the forward running direction so that second combustion can be produced immediately after the compression stroke TDC, and a mixture produced in the cylinder 12 is ignited immediately after the compression stroke TDC.

The aforementioned variation of the embodiment is desirable particularly when the piston 13 in the expansion stroke cylinder 12A is located closer toward the BDC side within the appropriate target range R at engine stop.

More specifically, when the position of the piston 13 in the expansion stroke cylinder 12A is located closer toward the TOC side within the appropriate target range R, the volume of air in the expansion stroke cylinder 12A is rather small so that the quantity of fuel injected into the expansion stroke cylinder 12A is relatively reduced. On the other hand, the volume of air in the compression stroke cylinder 12C which is in opposite phase with respect to the expansion stroke cylinder 12A is rather large so that the quantity of fuel injected into the compression stroke cylinder 12C can be relatively increased. Taking this relationship into consideration, the engine starting system of the foregoing embodiment may be so modified as to produce a lean-mixture air-fuel ratio (first air-fuel ratio) for the first combustion and an air-fuel ratio (first air-fuel ratio) equal to or lower than the stoichiometric air-fuel ratio for the second combustion so that the combustion can be made regardless of whether the crankshaft 3 turns in the reverse direction (compressing air in the expansion stroke cylinder 12A) or in the forward direction, or the combustion is made in the compression stroke cylinder 12C following the combustion in the expansion stroke cylinder 12A during forward running of the engine.

Also, while the foregoing discussion of the embodiment has illustrated an example in which the engine starting system is so structured that the quantity of air introduced into the individual cylinders 12A–12D is regulated by the intake air quantity regulator made of the throttle valve 23 disposed upstream of the surge tank 21b, the invention is not limited to this arrangement. For example, the engine starting system of the foregoing embodiment may be so modified that the individual cylinders 12A–12D are provided with variable valve actuating mechanisms of the prior art serving as an intake air quantity regulator for varying the lift of the intake valve 19 of each of the cylinders 12A–12D. Alternatively, the engine may employ multiple throttle valves of which valve bodies are disposed in the branched intake channels 21a for the individual cylinders 12A–12D for regulating the quantities of air introduced into the individual cylinders 12A–12D.

Furthermore, while the engine starting system of the foregoing embodiment is so structured as to simultaneously perform the operation for decreasing the opening K of the throttle valve 23 at the point in time t2 when the engine speed Ne has dropped down to the reference engine speed N2 of approximately 760 rpm after the fuel injection interruption and the operation for increasing the amount of electric power Ge generated by the alternator 28, it is not essentially necessary to perform these operations at the same time. For example, the engine starting system may be modified such that the amount of electric power Ge generated by the alternator 28 is increased at a time slightly earlier or later than the time (point in time t2) when the opening K of the throttle valve 23 is decreased.

Moreover, although the engine starting system of the foregoing embodiment is structured such that the ECU 2 causes the first combustion to occur in the compression stroke cylinder 12 for turning the crankshaft 3 a little in the reverse running direction at first and ignites the mixture compressed in the expansion stroke cylinder 12 when restarting the automatically stopped engine, the invention is not limited to the engine starting system thus structured. For example, the engine starting system may be modified in such a way that the engine is restarted by initial combustion produced in the expansion stroke cylinder 12 without turning in the reverse running direction at first.

As is apparent from the foregoing discussion that an engine starting system of the present invention is for automatically stopping an engine which includes a fuel injection controller for controlling the quantity of fuel to be injected by each of fuel injectors directly into a plurality of cylinders and fuel injection timing thereof, an ignition controller for controlling ignition timing of spark plugs of the individual cylinders, an intake air quantity regulator for regulating the quantity of intake air introduced into each of the cylinders, an alternator driven by the engine, and a rotating speed sensing device for detecting engine speed. The engine starting system includes an automatic engine stop controller for automatically stopping the engine by interrupting fuel injection from the fuel injectors as necessary for keeping the engine running when predefined automatic engine stop conditions are satisfied, and an automatic engine restart controller for automatically restarting the engine by causing the fuel injector of at least one of the cylinders which is on expansion stroke at engine stop and causing the spark plug of that cylinder to ignite a mixture produced therein when predefined engine restart conditions are satisfied. The aforesaid automatic engine stop controller sets the quantity of intake air regulated by the aforesaid intake air quantity regulator at a level higher than a minimum quantity of intake air necessary for keeping the engine running by a specific amount and sets a scavenging mode period for expelling in-cylinder exhaust gas by decreasing the amount of electric power generated by the aforesaid alternator prior to fulfillment of the automatic engine stop conditions in an early part of automatic engine stop control operation, the aforesaid automatic engine stop controller causes the aforesaid intake air quantity regulator to decrease the quantity of intake air and causes the aforesaid alternator to once decrease the amount of electric power generated thereby at a point in time when the engine speed drops down to a predetermined reference engine speed, and the aforesaid automatic engine stop controller causes the aforesaid alternator to increases the amount of electric power generated thereby after a lapse of a specific period of time.

The engine starting system thus structured offers efficiently enhanced exhaust gas scavenging performance when automatically stopping the engine at idle. Also, the engine starting system of the invention can cause the pistons to stop at appropriate positions in a more reliable fashion than ever and offer an enhanced engine restart capability.

In summary, an engine starting system according to a principal (first) aspect of the invention is for automatically stopping an engine which includes a fuel injection controller for controlling the quantity of fuel to be injected by each of fuel injectors directly into a plurality of cylinders and fuel injection timing thereof, an ignition controller for controlling ignition timing of spark plugs of the individual cylinders, an intake air quantity regulator for regulating the quantity of intake air introduced into each of the cylinders, an alternator driven by the engine, and a rotating speed sensing device for detecting engine speed. The engine starting system includes an automatic engine stop controller for automatically stopping the engine by interrupting fuel injection from the fuel injectors as necessary for keeping the engine running when predefined automatic engine stop conditions are satisfied, and an automatic engine restart controller for automatically restarting the engine by causing the fuel injector of at least one of the cylinders which is on expansion stroke at engine stop and causing the spark plug of that cylinder to ignite a mixture produced therein when predefined engine restart conditions are satisfied. The aforesaid automatic engine stop controller sets the quantity of intake air regulated by the aforesaid intake air quantity regulator at a level higher than a minimum quantity of intake air necessary for keeping the engine running by a specific amount and sets a scavenging mode period for expelling in-cylinder exhaust gas by decreasing the amount of electric power generated by the aforesaid alternator prior to fulfillment of the automatic engine stop conditions in an early part of automatic engine stop control operation, the aforesaid automatic engine stop controller causes the aforesaid intake air quantity regulator to decrease the quantity of intake air and causes the aforesaid alternator to once decrease the amount of electric power generated thereby at a point in time when the engine speed drops down to a predetermined reference engine speed, and the aforesaid automatic engine stop controller causes the aforesaid alternator to increases the amount of electric power generated thereby after a lapse of a specific period of time.

According to a second aspect of the invention based on the first aspect thereof, the engine starting system is structured such that, in executing the automatic engine stop control operation, the aforesaid automatic engine stop controller detects the engine speed at a point in time when a specific period of time has elapsed after the engine speed has dropped down to the predetermined reference engine speed and, based on the engine speed thus detected, the aforesaid automatic engine stop controller sets the amount of electric power to be generated by the aforesaid alternator at a smaller value when the detected engine speed low than when the detected engine speed is high.

According to a third aspect of the invention based on the first aspect thereof, the engine starting system is structured such that, in executing the automatic engine stop control operation, the aforesaid automatic engine stop controller adjusts the amount of electric power to be generated by the aforesaid alternator at a predetermined fixed value at the point in time when the engine speed has dropped down to the predetermined reference engine speed and, based on the engine speed detected by the aforesaid rotating speed sensing device from the aforesaid point in time to a point in time when a specific period of time elapses, the aforesaid automatic engine stop controller sets the amount of electric power to be generated by the aforesaid alternator at a larger value when the detected engine speed high than when the detected engine speed is low.

According to a fourth aspect of the invention based on the second or third aspect thereof, the engine starting system is structured such that, in executing the automatic engine stop control operation, the aforesaid automatic engine stop controller causes the aforesaid rotating speed sensing device to detect the engine speed when a piston goes beyond compression stroke top dead center and controls the amount of electric power generated by the aforesaid alternator based on the engine speed thus detected.

According to a fifth aspect of the invention based on the second or third aspect thereof, the engine starting system is structured such that, in executing the automatic engine stop control operation, the aforesaid automatic engine stop controller causes the aforesaid rotating speed sensing device to detect the rate of decrease in the engine speed at a point in time when a specific period of time has elapsed after the engine speed has dropped down to the predetermined reference engine speed, and the aforesaid automatic engine stop controller temporarily increases the amount of electric power generated by the aforesaid alternator if it is verified that the engine speed has significantly dropped based on the rate of decrease in the engine speed thus detected.

According to a sixth aspect of the invention based on the first aspect thereof, the engine starting system is structured such that, in executing the automatic engine stop control operation, the aforesaid automatic engine stop controller sets the engine speed at which the fuel injection is interrupted at a value higher than an ordinary idle engine speed at which the engine is not automatically stopped.

According to a seventh aspect of the invention based on the first aspect thereof, the engine starting system is structured such that, in executing the automatic engine stop control operation, the aforesaid automatic engine stop controller temporarily sets the amount of electric power generated by the aforesaid alternator at zero at a point in time when the fuel injection is interrupted.

According to an eighth aspect of the invention based on the first aspect thereof, the engine starting system is structured such that the aforesaid automatic engine stop controller sets a target engine speed having a higher value than an ordinary idle engine speed at which the engine is not automatically stopped at a point in time when the automatic engine stop conditions are satisfied, the aforesaid automatic engine stop controller controls the aforesaid intake air quantity regulator such that intake air pressure stabilizes at a fixed value, and the aforesaid automatic engine stop controller causes the aforesaid fuel injection controller to interrupt the fuel injection under conditions where the intake air pressure is stabilized.

According to a ninth aspect of the invention based on the first aspect thereof, the engine starting system is structured such that the aforesaid automatic engine stop controller switches an automatic transmission to a neutral position at a point in time when the automatic engine stop conditions are satisfied.

According to a tenth aspect of the invention based on the first aspect thereof, the engine starting system is structured such that, in executing the automatic engine stop control operation, the aforesaid automatic engine stop controller causes the aforesaid fuel injection controller to interrupt the fuel injection at an engine speed higher than an ordinary idle engine speed at which the engine is not automatically stopped, and subsequently causes the aforesaid ignition controller to continue igniting a mixture at least until the fuel fed into the cylinders is combusted.

According to an eleventh aspect of the invention based on the first aspect thereof, the engine starting system is structured such that the aforesaid reference engine speed is set at a value higher than an ordinary idle engine speed at which the engine is not automatically stopped.

This application is based on Japanese patent application No. 2004-095996 and No. 2004-095593, both filed in Japan Patent Office on Mar. 29, 2004, the contents of which are hereby incorporated by reference.

Although the present invention has been fully described by way of example with reference to the accompanying drawings, it is to be understood that various changes and modifications will be apparent to those skilled In the art. Therefore, unless otherwise such changes and modifications depart from the scope of the present invention hereinafter defined, they should be construed as being included therein.

What is claimed is:

1. An engine starting system for automatically stopping an engine which comprises: a fuel injection controller for controlling the quantity of fuel to be injected by each of fuel injectors directly into a plurality of cylinders and fuel injection timing thereof; an ignition controller for controlling ignition timing of spark plugs of the individual cylinders; an intake air quantity regulator for regulating the quantity of intake air introduced into each of the cylinders; an alternator driven by the engine; and a rotating speed sensing device for detecting engine speed; said engine starting system comprising:

an automatic engine stop controller for automatically stopping the engine by interrupting fuel injection from the fuel injectors as necessary for keeping the engine running when predefined automatic engine stop conditions are satisfied, and an automatic engine restart controller for automatically restarting the engine by causing the fuel injector of at least one of the cylinders which is on expansion stroke at engine stop and causing the spark plug of that cylinder to ignite a mixture produced therein when predefined engine restart conditions are satisfied;

wherein said automatic engine stop controller sets the quantity of intake air regulated by said intake air quantity regulator at a level higher than a minimum quantity of intake air necessary for keeping the engine running by a specific amount and sets a scavenging mode period for expelling in-cylinder exhaust gas by decreasing the amount of electric power generated by said alternator prior to fulfillment of the automatic engine stop conditions in an early part of automatic engine stop control operation, said automatic engine stop controller causes said intake air quantity regulator to decrease the quantity of intake air and causes said alternator to once decrease the amount of electric power generated thereby at a point in time when the engine speed drops down to a predetermined reference engine speed, and said automatic engine stop controller causes said alternator to increases the amount of electric power generated thereby after a lapse of a specific period of time.

2. The engine starting system according to claim 1, wherein, in executing the automatic engine stop control operation, said automatic engine stop controller detects the engine speed at a point in time when a specific period of time has elapsed after the engine speed has dropped down to the predetermined reference engine speed and, based on the engine speed thus detected, said automatic engine stop controller sets the amount of electric power to be generated by said alternator at a smaller value when the detected engine speed low than when the detected engine speed is high.

3. The engine starting system according to claim 2, wherein, in executing the automatic engine stop control operation, said automatic engine stop controller causes said rotating speed sensing device to detect the engine speed when a piston goes beyond compression stroke top dead center and controls the amount of electric power generated by said alternator based on the engine speed thus detected.

4. The engine starting system according to claim 2, wherein, in executing the automatic engine stop control operation, said automatic engine stop controller causes said rotating speed sensing device to detect the rate of decrease in the engine speed at a point in time when a specific period of time has elapsed after the engine speed has dropped down to the predetermined reference engine speed, and said automatic engine stop controller temporarily increases the amount of electric power generated by said alternator if it is verified that the engine speed has significantly dropped based on the rate of decrease in the engine speed thus detected.

5. The engine starting system according to claim 1, wherein, in executing the automatic engine stop control operation, said automatic engine stop controller adjusts the amount of electric power to be generated by said alternator at a predetermined fixed value at the point in time when the engine speed has dropped down to the predetermined reference engine speed and, based on the engine speed detected by said rotating speed sensing device from said point in time to a point in time when a specific period of time elapses, said automatic engine stop controller sets the amount of electric power to be generated by said alternator at a larger value when the detected engine speed high than when the detected engine speed is low.

6. The engine starting system according to claim 1, wherein, in executing the automatic engine stop control operation, said automatic engine stop controller sets the engine speed at which the fuel injection is interrupted at a value higher than an ordinary idle engine speed at which the engine is not automatically stopped.

7. The engine starting system according to claim 1 wherein, in executing the automatic engine stop control operation, said automatic engine stop controller temporarily sets the amount of electric power generated by said alternator at zero at a point in time when the fuel injection is interrupted.

8. The engine starting system according to claim 1, wherein said automatic engine stop controller sets a target engine speed having a higher value than an ordinary idle engine speed at which the engine is not automatically stopped at a point in time when the automatic engine stop conditions are satisfied, said automatic engine stop controller controls said intake air quantity regulator such that intake air pressure stabilizes at a fixed value, and said automatic engine stop controller causes said fuel injection controller to interrupt the fuel injection under conditions where the intake air pressure is stabilized.

9. The engine starting system according to claim 1, wherein said automatic engine stop controller switches an automatic transmission to a neutral position at a point in time when the automatic engine stop conditions are satisfied.

10. The engine starting system according to claim 1, wherein, in executing the automatic engine stop control operation, said automatic engine stop controller causes said fuel injection controller to interrupt the fuel injection at an engine speed higher than an ordinary idle engine speed at which the engine is not automatically stopped, and subsequently causes said ignition controller to continue igniting a mixture at least until the fuel fed into the cylinders is combusted.

11. The engine starting system according to claim 1, wherein said reference engine speed is set at a value higher than an ordinary idle engine speed at which the engine is not automatically stopped.

12. An engine starting system for automatically stopping an engine which comprises: fuel injectors for injecting fuel directly into a plurality of cylinders; spark plugs provided to the individual cylinders; a throttle valve for regulating the quantity of intake air of the engine; an electronic control unit for controlling the quantity of fuel to be injected by each of said fuel injectors and fuel injection timing thereof as well as ignition timing of said spark plugs and the opening of said throttle valve; an alternator driven by the engine; and an engine speed sensor for detecting engine speed; said engine starting system comprising:

an automatic engine stop controller for automatically stopping the engine by interrupting fuel injection from the fuel injectors as necessary for keeping the engine running when predefined automatic engine stop conditions are satisfied, and an automatic engine restart controller for automatically restarting the engine by causing the fuel injector of at least one of the cylinders which is on expansion stroke at engine stop and causing the spark plug of that cylinder to ignite a mixture produced therein when predefined engine restart conditions are satisfied;

wherein said automatic engine stop controller and said automatic engine restart controller are functionally included in said electronic control unit; and wherein said automatic engine stop controller sets the quantity of intake air regulated by said throttle valve at a level higher than a minimum quantity of intake air necessary for keeping the engine running by a specific amount and sets a scavenging mode period for expelling in-cylinder exhaust gas by decreasing the amount of electric power generated by said alternator prior to fulfillment of the automatic engine stop conditions in an early part of automatic engine stop control operation, said automatic engine stop controller causes said throttle valve to decrease the quantity of intake air and causes said alternator to once decrease the amount of electric power generated thereby at a point in time when the engine speed drops down to a predetermined reference engine speed, and said automatic engine stop controller causes said alternator to increases the amount of electric power generated thereby after a lapse of a specific period of time.

* * * * *